(12) United States Patent
Sasagawa et al.

(10) Patent No.: US 11,465,347 B2
(45) Date of Patent: Oct. 11, 2022

(54) PLASTICIZING DEVICE

(71) Applicant: Seiko Epson Corporation, Tokyo (JP)

(72) Inventors: Kakeru Sasagawa, Matsumoto (JP); Kei Yokota, Matsumoto (JP); Kenta Anegawa, Matsumoto (JP); Seiichiro Yamashita, Azumino (JP); Yusuke Watanabe, Shiojiri (JP); Yuichi Sasage, Suwa (JP); Mitsuru Inutsuka, Kawagoe (JP)

(73) Assignee: Seiko Epson Corporation

( * ) Notice: Subject to any disclaimer, the term of this patent is extended or adjusted under 35 U.S.C. 154(b) by 517 days.

(21) Appl. No.: 16/583,345

(22) Filed: Sep. 26, 2019

(65) Prior Publication Data

US 2020/0101661 A1 Apr. 2, 2020

(30) Foreign Application Priority Data

Sep. 27, 2018 (JP) .............................. JP2018-181458

(51) Int. Cl.
*B29C 64/209* (2017.01)
*B33Y 30/00* (2015.01)
*B29C 64/241* (2017.01)
*B29C 64/118* (2017.01)

(52) U.S. Cl.
CPC .......... *B29C 64/209* (2017.08); *B29C 64/118* (2017.08); *B29C 64/241* (2017.08); *B33Y 30/00* (2014.12)

(58) Field of Classification Search
CPC ... B29C 48/685; B29C 64/106; B29C 64/118; B29C 64/209; B29C 64/241; B33Y 30/00
See application file for complete search history.

(56) References Cited

U.S. PATENT DOCUMENTS

| | | | |
|---|---|---|---|
| 3,355,764 A | 12/1967 | Moyer | |
| 3,577,841 A | 5/1971 | Ledoux et al. | |
| 3,790,328 A | 2/1974 | Maxwell | |
| 3,829,270 A * | 8/1974 | DeBonth | B29C 48/47 |
| | | | 425/207 |
| 4,553,922 A | 11/1985 | Winner | |
| 6,077,062 A | 6/2000 | Guillemette et al. | |
| 6,187,237 B1 | 2/2001 | Kirjavainen et al. | |
| 6,217,206 B1 | 4/2001 | Kirjavainen et al. | |
| 10,800,083 B2 | 10/2020 | Zhu | |

(Continued)

FOREIGN PATENT DOCUMENTS

| | | |
|---|---|---|
| JP | S52-021020 B1 | 6/1977 |
| JP | S62-018236 A | 1/1987 |

(Continued)

*Primary Examiner* — Manley L Cummins, IV
(74) *Attorney, Agent, or Firm* — Harness, Dickey & Pierce, P.L.C.

(57) ABSTRACT

A plasticizing device includes a driving motor, a rotor that is rotated by rotation of the driving motor and has a groove-formed surface having a groove formed in a rotation direction, and a barrel that is opposite to the groove-formed surface and has a communication hole and a heater, plasticizes a material supplied between the groove and the barrel by rotation of the rotor and heating by the heater, and causes the plasticized material to flow out from the communication hole. Aside surface of the groove has a protrusion and recess surface including protrusion portions or recess portions.

8 Claims, 11 Drawing Sheets

(56) References Cited

U.S. PATENT DOCUMENTS

| | | |
|---|---|---|
| 11,034,088 B2 | 6/2021 | Yamasaki et al. |
| 11,034,089 B2 | 6/2021 | Yamasaki |
| 2007/0082079 A1 | 4/2007 | Peavey et al. |
| 2009/0020906 A1 | 1/2009 | Neumann |
| 2009/0096129 A1 | 4/2009 | Hirota et al. |
| 2010/0316754 A1 | 12/2010 | Lupke et al. |
| 2017/0210069 A1 | 7/2017 | Stubenruss |
| 2018/0311894 A1 | 11/2018 | Saito et al. |
| 2018/0326658 A1 | 11/2018 | Saito et al. |
| 2019/0061243 A1 | 2/2019 | Saito et al. |
| 2019/0160746 A1 | 5/2019 | Anegawa et al. |
| 2019/0248069 A1 | 8/2019 | Anegawa et al. |
| 2019/0255762 A1 | 8/2019 | Mizukami et al. |
| 2019/0255772 A1 | 8/2019 | Mizukami et al. |
| 2019/0283321 A1 | 9/2019 | Mizukami et al. |
| 2019/0358903 A1 | 11/2019 | Watanabe et al. |
| 2020/0016832 A1 | 1/2020 | Yuwaki et al. |
| 2020/0016833 A1 | 1/2020 | Yuwaki et al. |
| 2020/0016834 A1 | 1/2020 | Yuwaki et al. |
| 2020/0031037 A1 | 1/2020 | Hideshima |
| 2020/0061914 A1 | 2/2020 | Onishi |
| 2020/0094476 A1 | 3/2020 | Yamasaki et al. |
| 2020/0101661 A1 | 4/2020 | Sasagawa et al. |
| 2020/0101672 A1 | 4/2020 | Watanabe et al. |
| 2020/0114582 A1 | 4/2020 | Hideshima |
| 2020/0122407 A1 | 4/2020 | Yamazaki |
| 2020/0139629 A1 | 5/2020 | Yokota |
| 2020/0164589 A1 | 5/2020 | Yuwaki et al. |
| 2020/0171745 A1 | 6/2020 | Yuwaki et al. |
| 2020/0207016 A1 | 7/2020 | Anegawa et al. |
| 2020/0207017 A1 | 7/2020 | Yuwaki et al. |
| 2020/0238611 A1 | 7/2020 | Watanabe |
| 2020/0238612 A1 | 7/2020 | Watanabe |
| 2020/0269502 A1 | 8/2020 | Anegawa et al. |
| 2020/0269515 A1 | 8/2020 | Takahashi |
| 2020/0307082 A1 | 10/2020 | Yuwaki et al. |
| 2020/0307091 A1 | 10/2020 | Kobayashi |
| 2020/0307093 A1 | 10/2020 | Yuwaki et al. |

FOREIGN PATENT DOCUMENTS

| | | |
|---|---|---|
| JP | H03-153311 A | 7/1991 |
| JP | H05-138756 A | 6/1993 |
| JP | H10-230542 A | 9/1998 |
| JP | 2006-035582 A | 2/2006 |
| JP | 2006-247917 A | 9/2006 |
| JP | 2007-245503 A | 9/2007 |
| JP | 2009-137260 A | 6/2009 |
| JP | 2009-269182 A | 11/2009 |
| JP | 2009-269183 A | 11/2009 |
| JP | 2009-285879 A | 12/2009 |
| JP | 2010-000752 A | 1/2010 |
| JP | 2010-052264 A | 3/2010 |
| JP | 2010-208051 A | 9/2010 |
| JP | 2010-214839 A | 9/2010 |
| JP | 2010-241016 A | 10/2010 |
| JP | 2011-020378 A | 2/2011 |
| JP | 6088818 B2 | 12/2012 |
| JP | 2014-237300 A | 12/2014 |
| JP | 2015-101053 A | 6/2015 |
| JP | 2017-023981 A | 2/2017 |
| JP | 2018-079652 A | 5/2018 |
| JP | 2018-187777 A | 11/2018 |
| WO | 2007/119533 A1 | 10/2007 |
| WO | 2008-100467 A1 | 8/2008 |
| WO | 2016/020150 A1 | 2/2016 |

* cited by examiner

| SAMPLE | | S1 | S2 | S3 |
|---|---|---|---|---|
| RADIUS r (mm) | | 40.0 | 40.0 | 40.0 |
| NUMBER n OF GROOVES | | 2 | 2 | 2 |
| WIDTH w OF GROOVE (mm) | | 8.6 | 9.6 | 7.6 |
| n × w/r | | 0.43 | 0.48 | 0.38 |
| AVERAGE EJECTION RATE (%) | PP | 80.8 | 83.8 | 67.6 |
| | TPU | 56.0 | 71.6 | 62.2 |

| SAMPLE | S1 | S4 | S5 |
|---|---|---|---|
| DEPTH Da AT OPEN END PORTION (mm) | 15.0 | 16.0 | 16.0 |
| RANGE IN WHICH DEPTH Da IS MAINTAINED | PA1 | PA1 | PA1, PA2 |
| DEPTH OF THE GROOVE AT THE CENTER OF THE GROOVE-FORMED SURFACE (mm) | 2.2 | 2.2 | 2.2 |
| Da/Db | 6.82 | 7.27 | 7.27 |
| AVERAGE INJECTION RATE (%) PP | 80.8 | 75.5 | 84.0 |
| AVERAGE INJECTION RATE (%) TPU | 56.0 | 71.5 | 75.8 |

PLASTICIZING DEVICE

The present application is based on, and claims priority from, JP Application Serial Number 2018-181458, filed Sep. 27, 2018, the disclosure of which is hereby incorporated by reference herein in its entirety.

BACKGROUND

1. Technical Field

The present disclosure relates to a plasticizing device.

2. Related Art

Plasticizing devices that plasticize materials that are used in three-dimensional modeling or injection molding by applying heat thereto are known. For example, Patent Document 1 discloses a plasticizing device that plasticizes a material supplied to a groove in a rotor by heating using the rotor and the rotation of the rotor. In the plasticizing device of Patent Document 1, the material is supplied into the groove from an end portion of the groove opened on an outer circumference side surface of the rotor and led to a central portion of the rotor along the groove by the rotation of the rotor.

In plasticizing devices that plasticize materials using a rotor as described above, there has been a case where a material is not smoothly led in a groove and the material is not stably plasticized. An advantage of some aspects of the present disclosure is to, in a plasticizing device, lead a material so as to be smoothly sent in a groove of a rotor and enable the stable plasticization of the material.

SUMMARY

An aspect of a technique of the present disclosure is provided as a plasticizing device including a driving motor, a rotor that is rotated by rotation of the driving motor and has a groove-formed surface having a groove formed in a rotation direction, and a barrel that is opposite to the groove-formed surface and has a communication hole and a heater, in which a material supplied between the groove and the barrel is plasticized by rotation of the rotor and heating by the heater and is caused to flow out from the communication hole, and a side surface of the groove has a protrusion and recess surface including a protrusion portion or a recess portion.

DESCRIPTION OF EXEMPLARY EMBODIMENTS

1. First Embodiment

1-1. Configuration of Three-Dimensional Modeling Device

Figure 1:
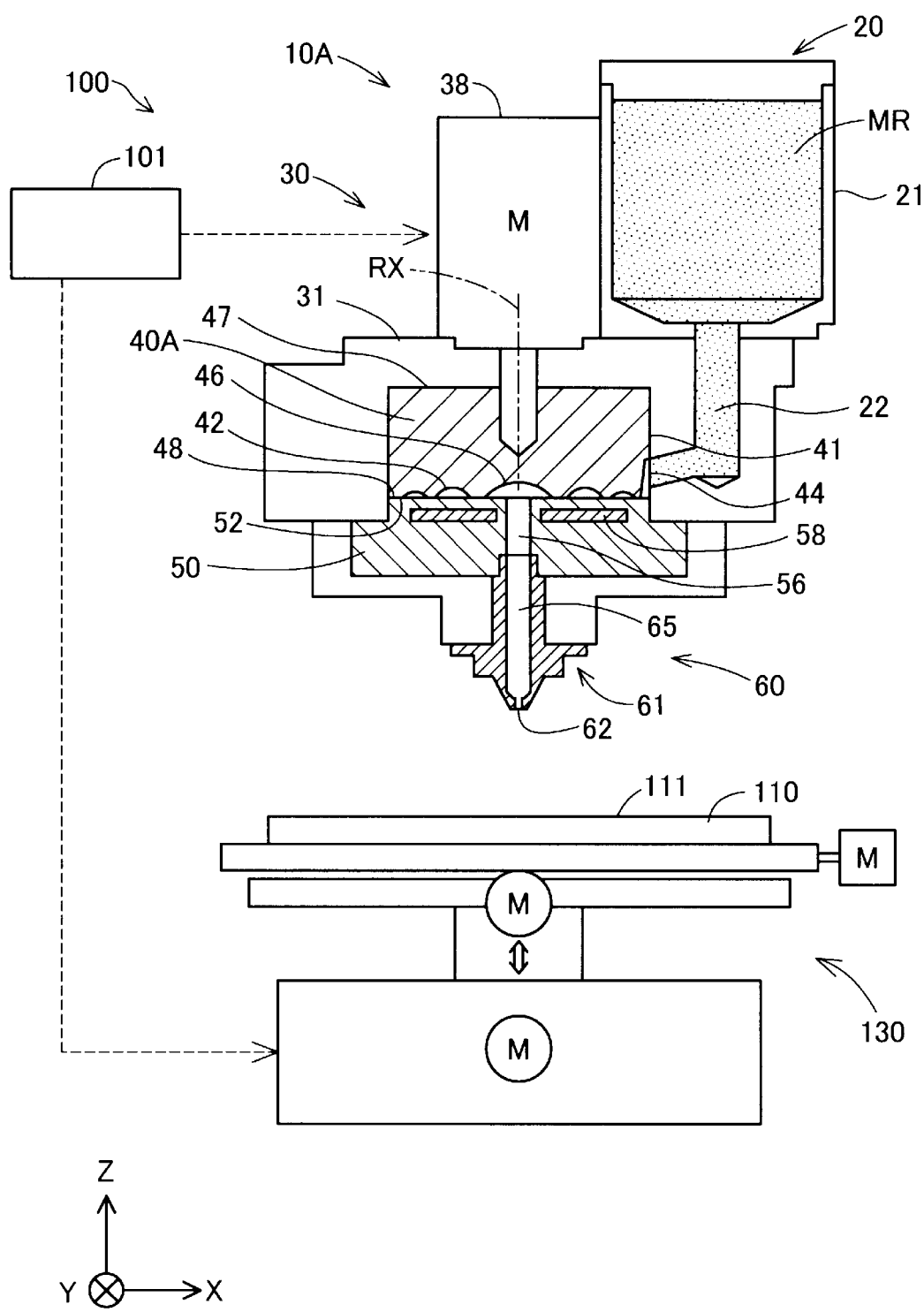
FIG. 1 is a schematic view showing a configuration of a three-dimensional modeling device including a plasticizing device in a first embodiment.

FIG. 1 is a schematic view showing a configuration of a three-dimensional modeling device 100 including a plasticizing device 10A in a first embodiment. In FIG. 1, three arrows indicating X, Y, and Z directions that are orthogonal to each other are shown. The X direction indicated by an arrow X and the Y direction indicated by an arrow Y are parallel to the horizontal surface, and the Z direction indicated by an arrow Z is a vertical direction, that is, a direction opposite to the direction of gravitational force. In other reference views as well, the arrows X, Y, and Z will be shown so appropriately that directions shown in the views correspond to those in FIG. 1.

The three-dimensional modeling device 100 includes the plasticizing device 10A and models a three-dimensional modeled substance by accumulating a plasticized modeling material using the plasticizing device 10A. "Plasticizing" refers to the melting of a thermoplastic substance by applying heat thereto. Hereinafter, the "three-dimensional modeling device" will also be simply referred to as the "modeling device", and the three-dimensional modeled substance will also be simply referred to as the "modeled substance".

The plasticizing device 10A includes a supply portion 20 that supplies a material MR that is a material to be plasticized and a generation portion 30 that generates a modeling material by plasticizing the material MR. The supply portion 20 includes a material supply source 21 that stores the material MR and a connection pipe line 22 that causes the material MR in the material supply source 21 to flow to the generation portion 30.

The material supply source 21 is configured of, for example, a hopper that accommodates the material MR. The material supply source 21 has a discharge opening in the bottom. The discharge opening is connected to the generation portion 30 through the connection pipe line 22. In the first embodiment, the material MR is injected into the material supply source 21 in a form of a spherical or cylindrical pellet having a dimension maximum value of approximately 2 to 5 mm. A specific example of the material MR will be described below. In other embodiments, the material MR may be supplied to the generation portion 30 in a non-pellet form and may be supplied to the generation portion 30, for example, in a particle form, a powder form, or a liquid form.

The generation portion 30 generates a paste-form modeling material that has melted and developed fluidity by plasticizing the material MR supplied from the material supply source 21 and leads the modeling material to an ejection portion 60. The generation portion 30 has a case 31, a driving motor 38, a flat screw 40A, and a facing portion 50.

The case 31 has a recess portion space opened in a direction opposite to the Z direction and accommodates the flat screw 40A. Hereinafter, the case 31 covers an outer circumference side surface 41 and an upper surface 47 of the flat screw 40A. The driving motor 38 is disposed on the case 31. The driving motor 38 is coupled to the upper surface 47 side of the flat screw 40A through a through hole provided in a top surface portion of the case 31. The driving motor 38 is driven under the control of a control portion 101 and rotates the flat screw 40A in the case 31.

The flat screw 40A is one type of a rotor, plasticizes the material MR under kneading in a groove by rotation, and sends out the material. "Kneading" refers to the mixing and compounding materials. The flat screw 40A has a substantially cylindrical shape in which the height, that is, the dimension in an axial line direction that is a direction along the central axis thereof is smaller than the diameter. In the first embodiment, the flat screw 40A is disposed so that the axial line direction becomes parallel to the Z direction. The central axis of the flat screw 40A coincides with a rotation axis RX thereof. FIG. 1 shows the rotation axis RX of the flat screw 40A using a dot-and-dash line.

Figure 3:
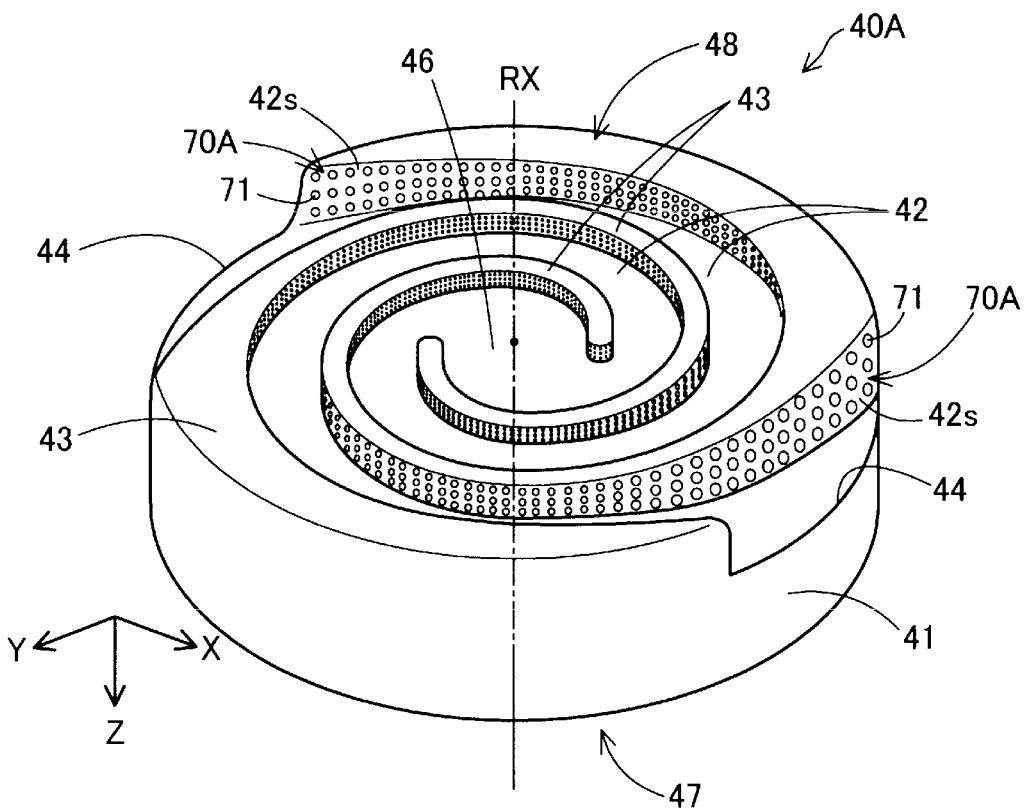
FIG. 3 is a schematic perspective view showing a configuration of a flat screw of the first embodiment.

Grooves 42 are formed on a lower surface 48 of the flat screw 40A. Hereinafter, the lower surface 48 of the flat screw 40A will also be referred to as "groove-formed surface 48". As shown in FIG. 3 that will be referenced below, the grooves 42 are formed on the groove-formed surface 48 so as to draw a curved line along a rotation direction of the flat screw 40A. In the first embodiment, the groove 42 is configured as a scroll groove formed in a vortex shape from the outer circumference side surface 41 that is an outer circumferential end portion toward a central portion 46 through which the rotation axis RX passes. Hereinafter, the groove 42 will also be referred to as "scroll groove 42". The scroll groove 42 may be configured so as to extend in a spiral shape around the central portion 46.

The groove-formed surface 48 of the flat screw 40A faces an upper surface of the facing portion 50, that is, the opposite surface 52 that is a surface on the Z-direction side. Hereinafter, the facing portion 50 will also be referred to as "screw facing portion 50", and the opposite surface 52 will also be referred to as "screw opposite surface 52". A space is formed between the scroll grooves 42 and the central portion 46 of the flat screw 40A and the screw opposite surface 52 of the screw facing portion 50. The material MR is introduced to the spaces in the scroll grooves 42 between the flat screw 40A and the screw facing portion 50 from the connection pipe line 22 of the supply portion 20 through open end portions 44 of the scroll grooves 42 that are opened on the outer circumference side surface 41 of the flat screw 40A. Hereinafter, the open end portion 44 of the scroll groove 42 will also be referred to as "material introduction portion 44". The specific configurations of the flat screw 40A and the scroll grooves 42 thereof will be described below.

The screw facing portion 50 is also referred to as "barrel". In the screw facing portion 50, heaters 58 that heat the material MR supplied into the scroll grooves 42 of the rotating flat screw 40A are embedded below the screw opposite surface 52. In the center of the screw opposite surface 52, a communication hole 56 that connects the central portion 46 of the flat screw 40A and the ejection portion 60 is provided. The material MR supplied into the scroll grooves 42 receives heat from the heaters 58, is melted, is kneaded in the scroll grooves 42, flows along the scroll grooves 42, and is led to the central portion 46 of the flat screw 40A as the modeling material. The modeling material that has flown into the central portion 46 and has been plasticized flows out to the ejection portion 60 through the communication hole 56 in the center of the screw opposite surface 52.

As described above, the material MR is plasticized in the generation portion 30 by heating by the heaters 58 and the rotation of the flat screw 40A. In the modeling material, not all kinds of substances that configure the material MR need to be plasticized and melted. The modeling material simply needs to be converted to a state in which the modeling material has fluidity as a whole by the fact that at least some kinds of substances among the substances that configure the modeling material are melted.

In addition to the plasticizing device 10A, the modeling device 100 further includes the control portion 101 that controls the modeling device 100, the ejection portion that ejects the modeling material generated in the plasticizing device 10A, a table for modeling 110 that serves as a base of a modeled substance, and a movement mechanism 130 that controls the ejection location of the modeling material.

The control portion 101 controls the plasticizing device 10A, the ejection portion 60, and the movement mechanism 130, thereby executing a molding treatment for modeling a modeled substance. In the first embodiment, the control portion 101 is configured of a computer including at least one processor and a main storage device. The control portion 101 exhibits a variety of functions by causing the processor to execute a program or a command loaded in the main storage device. At least a part of the functions of the control portion 101 may be realized using a hardware circuit.

The ejection portion 60 ejects the modeling material supplied from the plasticizing device 10A to a target location on a table 110 under the control of the control portion 101. The ejection portion 60 includes a nozzle 61 that ejects the modeling material and a flow path 65 that leads the modeling material to the nozzle 61.

The nozzle 61 is connected to the communication hole 56 of the screw facing portion 50 in the plasticizing device 10A through the flow path 65. In the flow path 65, a valve mechanism, a negative pressure generation mechanism, or the like for controlling the flow rate of the modeling material may be provided. The modeling material generated in the generation portion 30 is ejected from an ejection opening 62 provided at the front end of the nozzle 61 toward the table 110.

The table 110 is disposed at a location facing the ejection opening 62 of the nozzle 61. In the first embodiment, a surface 111 of the table 110 that faces the ejection opening 62 of the nozzle 61 is disposed horizontally, that is, parallel to the X direction and the Y direction. The modeling device 100 models a modeled substance by repeating a treatment that accumulates the modeling material at a target location on the surface 111 of the table 110 which has been previously determined according to modeling data.

The movement mechanism 130 changes the relative locational relationship between the table 110 and the nozzle 61. In the first embodiment, the location of the nozzle 61 is fixed, and the movement mechanism 130 moves the table 110. The movement mechanism 130 is configured of a triaxial positioner that moves the table 110 in three-axis directions parallel to the X, Y, and Z directions using a driving force of three motors M. The movement mechanism 130 changes the relative locational position between the nozzle 61 and the table 110 under the control of the control portion 101.

In other embodiments, instead of the configuration in which the table 110 is moved using the movement mechanism 130, a configuration in which the movement mechanism 130 moves the nozzle 61 with respect to the table 110 in a state in which the location of the table 110 is fixed may be employed. Even in such a configuration, it is possible to change the relative location of the nozzle 61 with respect to the table 110. In addition, in other embodiments, a configuration in which the movement mechanism 130 respectively moves the table 110 and the nozzle 61, thereby changing the relative locations of both may be employed.

1-2. Modeling Treatment in Three-Dimensional Modeling Device

Figure 2:
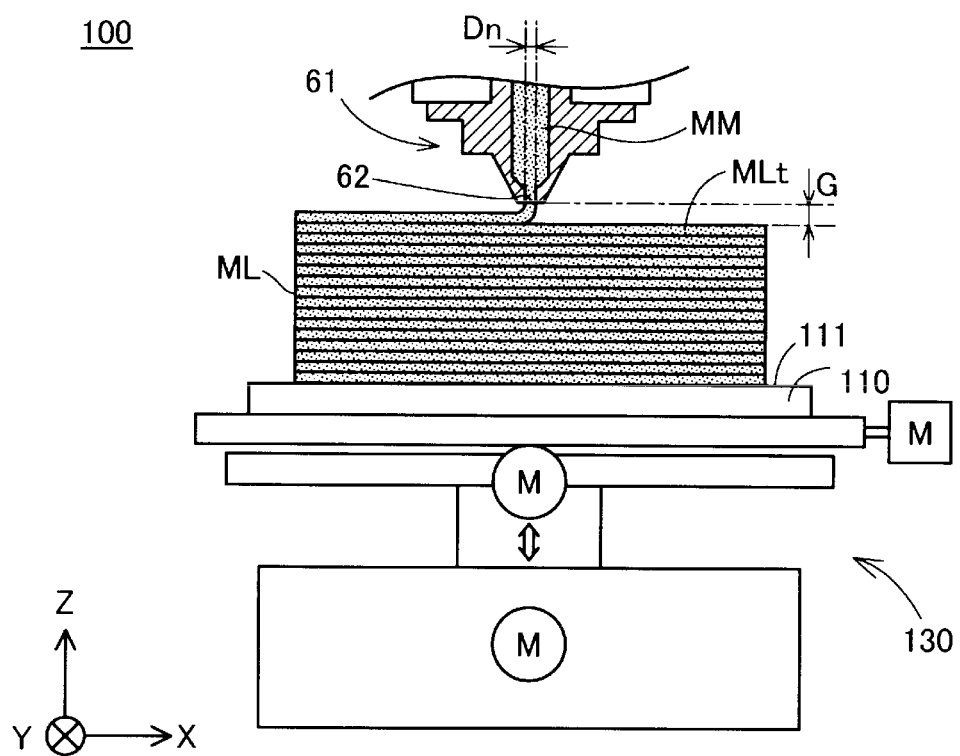
FIG. 2 is a schematic view schematically showing an appearance of a three-dimensional modeled substance being modeled.

FIG. 2 is a schematic view schematically showing an appearance in which a modeled substance is being modeled in the modeling device 100. The control portion 101 repeats scanning for ejecting a modeling material MM from the nozzle 61 and accumulating the modeling material MM while changing the location of the nozzle 61 with respect to the table 110 in a direction along the surface 111 of the table 110, thereby forming a material layer ML. The control portion 101 stacks the material layer ML in the Z direction, thereby modeling a molded substance.

At the time of forming the material layer ML, a gap G that is larger than a pore diameter Dn of the nozzle 61 is formed between the ejection opening 62 of the nozzle 61 and a planned portion MLt in which the modeling material MM is to be accumulated is formed. Therefore, the modeling material MM that is ejected from the ejection opening 62 of the nozzle 61 is accumulated in a state of being pressed onto the planed portion MLt, and the horizontal cross-sectional shape of the modeling material MM ejected from the nozzle 61 being collapsed is suppressed, and thus it is possible to reduce the surface roughness of the modeled substance. In addition, in the configuration in which the heaters are provided around the nozzle 61, due to the formation of the gap G, the overheating of the modeling material MM by the heaters can be prevented, and it is possible to suppress the discoloration or deterioration of the modeling material MM after being accumulation which is caused by overheating.

1-3. Flat Screw and Screw Facing Surface

FIG. 3 is a schematic perspective view showing a configuration of a groove-formed surface 48 side of the flat screw 40A in the first embodiment. In FIG. 3, the location of the rotation axis RX of the flat screw 40A in the generation portion 30 is indicated by a dot-and-dash line. The rotation axis RX passes through the center of the flat screw 40A.

On the groove-formed surface 48, as shown in FIG. 1, the scroll grooves 42 are formed from the outer circumferential end of the flat screw 40A to the central portion 46. On the groove-formed surface 48, protrusion ridge portions 43 that configure side wall portions that pinch the scroll grooves 42 in the width direction are provided. The central portion 46 is located in the center of the groove-formed surface 48 and is configured of recess portions surrounded by the protrusion ridge portions 43. The central portion 46 can also be interpreted as an end portion of the scroll groove 42.

The flat screw 40A of the first embodiment has two scroll grooves 42 and two protrusion ridge portion 43. In other embodiments, the number of the scroll grooves 42 or the protrusion ridge portions 43 is not limited two. The number of the scroll grooves 42 provided may be only one or an arbitrary number of three or more. In addition, an arbitrary number of protrusion ridge portions 43 may be provided in accordance with the number of the scroll grooves 42.

The flat screw 40A of the first embodiment has two material introduction portions 44 at the outer circumferential end. In other embodiments, the number of the material introduction portions 44 is not limited to two. The number of the material introduction portions 44 provided may be only one or an arbitrary number of three or more.

In the first embodiment, the depth of the scroll groove 42 decreases from the material introduction portion 44 toward the central portion 46. The width of the scroll groove 42 decreases toward the central portion 46 in an inlet portion near the material introduction portion 44 and is then maintained almost uniform through the central portion 46. Therefore, the flow path cross-sectional area of the scroll groove 42 decreases from the material introduction portion 44 toward the central portion 46. Therefore, the pressure in the central portion 46 further increases at the time of plasticizing the material MR. In addition, at the time of plasticizing the material MR, the air present in pores in the material MR is pushed out toward the material introduction portion 44 side by the pressure that is generated in the scroll grooves 42, and thus the deaeration of the modeling material is accelerated.

A side wall surface of the protrusion ridge portion 43 configures a side surface 42s of the scroll groove 42. A protrusion and recess structure 70A is formed on the side surface 42s of the scroll groove 42. In the first embodiment, the protrusion and recess structure 70A is configured as a protrusion and recess surface including a plurality of recess portions 71. The recess portions 71 are portions that are locally hollow with respect to the side surface 42s that is a criterion surface configuring a continuous curved surface from the open end portion 44 of the scroll groove 42 toward the central portion 46. In the first embodiment, the protrusion and recess structure 70A is formed on each of the side surfaces 42s on both sides of the scroll groove 42. In the plasticizing device 10A, the protrusion and recess structures 70A are formed on the side surfaces 42s of the scroll groove 42, whereby the material is smoothly led by the scroll grooves 42. The detail of the protrusion and recess structure 70A will be described below.

Figure 4:
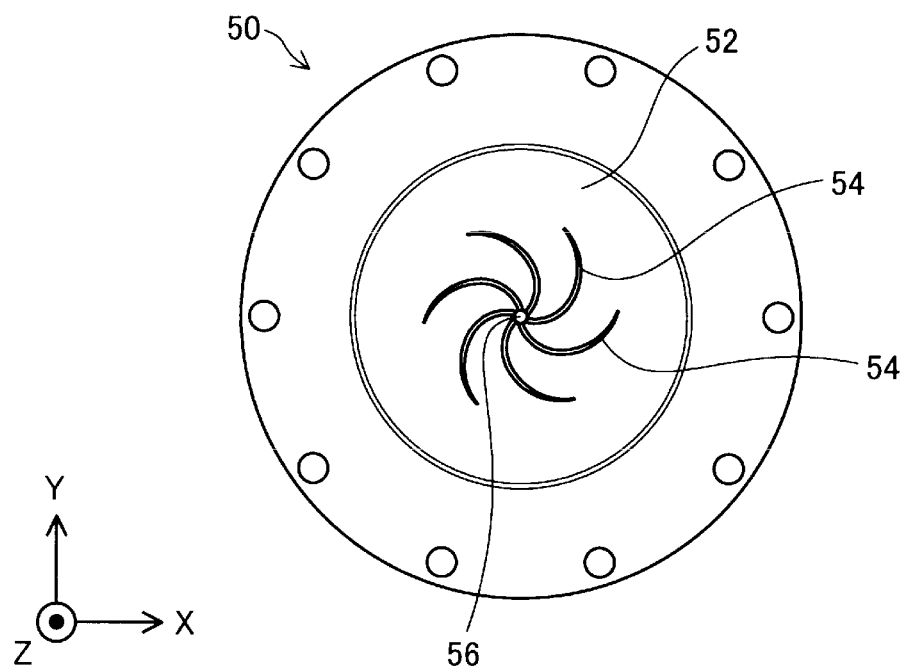
FIG. 4 is a schematic plan view showing a screw opposite surface of a screw facing portion.

FIG. 4 is a schematic plan view showing the screw opposite surface 52 of the screw facing portion 50. In the center of the screw opposite surface 52, the above-described communication hole 56 for supplying the modeling material to the nozzle 61 is opened. In addition, a plurality of guide grooves 54 that is connected to the communication hole 56 and extends in a spiral shape from the communication hole 56 toward the outer circumference is formed. The plurality of guide grooves 54 is provided in a region facing the central portion 46 of the flat screw 40A and has a function of leading the modeling material that has been led to the scroll grooves 42 and flowed into the central portion 46 to the communication hole 56.

FIG. 1 and FIG. 3 will be referred to. When the flat screw 40A rotates, the material MR supplied from the material introduction portions 44 is led to the scroll grooves 42 and moves toward the central portion 46 while being heated by the heaters 58 shown in FIG. 1. The material MR gets melted and more fluid toward the central portion 46 and is converted to a modeling material. The modeling material that has gathered in the central portion 46 is led to the flow path 65 of the nozzle 61 through the communication hole 56 by the pressure that is generated in the central portion 46 and is ejected from the ejection opening 62.

The plasticizing device 10A employs the flat screw 40A having a small size in the Z direction, which decreases a range in the Z direction occupied by the flow path for plasticizing and leading the material MR to the nozzle 61 and reduces the size of the plasticizing device. Additionally, in the modeling device 100, a configuration in which the modeling material is sent by pressure to the nozzle 61 using the flat screw 40A in the plasticizing device 10A is easily realized. According to this configuration, the amount of the modeling material ejected from the nozzle 61 can be controlled using the rotation speed of the flat screw 40A, which facilitates the control of the amount of the modeling material elected from the nozzle 61.

1-4. Protrusion and Recess Surface of Side Surface of Scroll Groove

Figure 5:
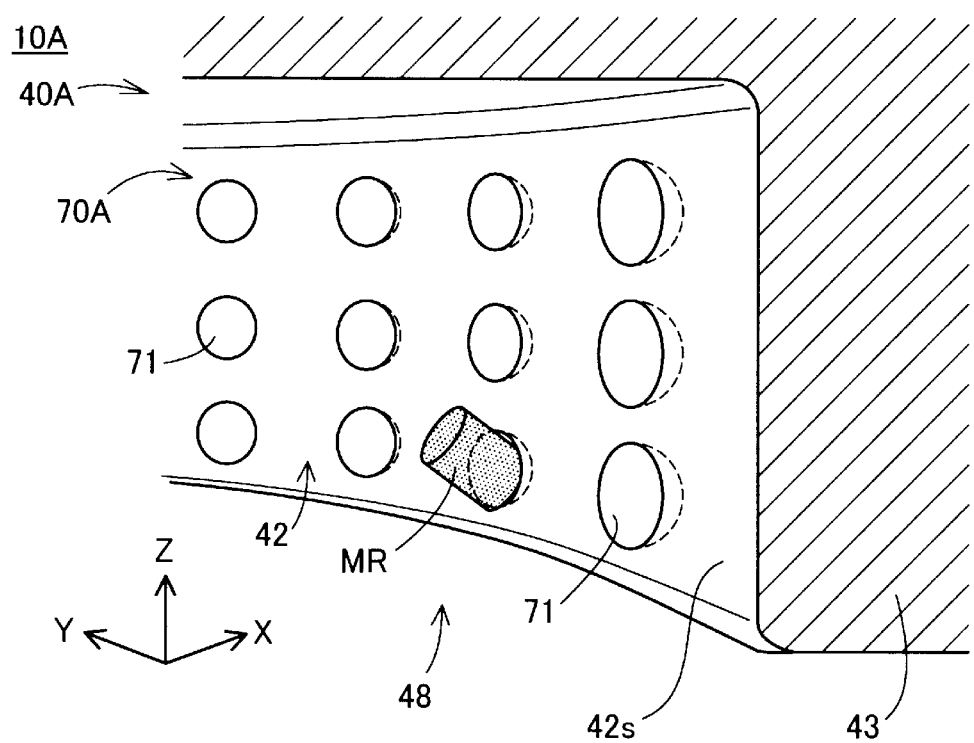
FIG. 5 is a schematic perspective view showing a protrusion and recess structure provided on a side surface of a scroll groove of the first embodiment.

The protrusion and recess structure 70A that is provided on the side surface 42s of the scroll groove 42 will be described with reference to FIG. 3 and FIG. 5. FIG. 5 is a schematic perspective view schematically showing a configuration of a part of the scroll groove 42 of the flat screw 40A in a cross-sectional view.

In the first embodiment, each recess portion 71 is hollow with respect to the flat surface of a circumferential edge included in the above-described criterion surface and is formed as a semispherical hollow portion that is opened toward the scroll groove 42. In the first embodiment, regarding the dimensions of the opening of each recess portion 71, the recess portion is formed to be approximately 5% to 20% of the height of the protrusion ridge portion 43 at the portion at which the recess portion 71 is formed, that is, the depth of the scroll groove 42. The radius of the opening of each recess portion 71 may be set to 1 mm or less. In this case, the area of the opening of each recess portion 71 is $\pi$ mm$^2$ or less. The size of each recess portion 71 may not be uniform. In the first embodiment, as shown in FIG. 3, the plurality of recess portions 71 are arranged from the outer circumferential end of the flat screw 40A through the central portion 46. In addition, as shown in FIG. 3 and FIG. 5, the plurality of recess portions 71 is arranged in the Z direction on the side surface 42s of the scroll groove 42.

The formation of the protrusion and recess structures 70A increase resistance between the side surfaces 42s of the scroll grooves 42 and the material MR supplied into the scroll grooves 42. Therefore, it becomes easy to transfer the rotational force of the flat screw 40A to the material MR in the scroll grooves 42, which causes the material MR to better follow the rotation of the flat screw 40A in the scroll grooves 42. Therefore, even when the material MR gets melted and more fluid and almost turns into liquid in the middle of the scroll groove 42, it is possible to smoothly lead the material MR to the central portion 46 of the flat screw 40A. In addition, the material MR in the scroll grooves 42 is stirred by the protrusion and recess structures 70A, and thus the degree of kneading of a modeling material to be generated increases. The expression "the degree of kneading of a material increases" means that the material is kneaded so as to be in a more uniform state. When the degree of kneading of the modeling material increases, it is possible to increase the modeling accuracy or strength of the modeled substance.

As described above, in the first embodiment, the material MR is injected in a pellet state. In a case where the material MR has a pellet shape, the dimension of the recess portion 71 that is provided in a section in which the material MR maintains the pellet shape in the scroll groove 42 is desirably a dimension with which a part of the pellet-shaped material MR falls into the recess portion. The radius of the opening of the recess portion 71 is desirably smaller than the widths of the pellet-shaped material MR in all directions. The area of the space of the recess portion 71 is desirably smaller than the volume of the pellet-shaped material MR. In such a case, the pellet-shaped material MR is likely to partially fall into the recess portion 71 as shown in FIG. 5. Therefore, it becomes easy to cause the material MR to better follow the rotation of the flat screw 40A, and the staying of the pellet-shaped material MR near the side surfaces 42s of the scroll grooves 42 is suppressed. In addition, the recess portions 71 having such a dimension provided in the circumferential edges of the material introduction portions 44 of the flat screw 40A cause the pellet-like material MR to be stuck to the recess portions 71 and be likely to be drawn into the scroll grooves 42. Therefore, the material MR is caused to smoothly flow into the scroll grooves 42.

1-5. Example of Material Being Injected into Plasticizing Device

An example of a material being injected into the plasticizing device 10A will be described. In the first embodiment, a principal material of a modeled substance that the modeling device 100 will model is injected into the plasticizing device 10A as the material MR. Here, the "principal material" refers to a material that serves as a key for configuring the shape of the modeled substance and refers to a material that has a content ratio of 50% by weight or more of the modeled substance. In the modeling device 100 of the first embodiment, the modeled substance is modeled using, for example, a thermoplastic material or a variety of materials such as a metallic material and a ceramic material, as the principal material. The modeling material that is generated in the plasticizing device 10A includes a melt of the above-described principal material alone or a pellet-shaped substance formed by the melting of some of components that are contained together with the principal material.

As the thermoplastic material that is used as the principal material of the modeled substance, for example, the following thermoplastic resin materials can be employed.

Examples of Thermoplastic Resin Material

General-purpose engineering plastics such as urethane-based thermoplastic elastomer resins (TPU), polypropylene resins (PP), polyethylene resins (PE), polyacetal resins (POM), polyvinyl chloride resins (PVC), polyamide resins (PA), acrylonitrile.butadiene.styrene resins (ABS), polylactic resins (PLA), polyphenylene sulfide resins (PPS), polyetheretherketone (PEEK), polycarbonate (PC), modified polyphenylene ether, polybutylene terephthalate, and polyethylene terephthalate and engineering plastics such as polysulfone, polyethersulfone, polyphenylene sulfide, polyarylate, polyimide, polyamide-imide, polyetherimide, and polyether ether ketone Into the thermoplastic material, a pigment, metal, and, ceramic, additionally, an additive such as was, a flame retardant, an antioxidant, or a heat stabilizer, and the like may be mixed. The modeling material generated by the melting of the thermoplastic material cures due to the lowering of temperature after ejected from the nozzle 61. The thermoplastic material is desirably injected from the nozzle 61 in a state of being fully melted by being heated to a glass transition temperature thereof or higher. For example, the glass transition temperature of the ABS resin is approximately 120° C., and the temperature of the ABS resin at the time of being ejected from the nozzle 61 is desirably approximately 200° C. In order to eject the modeling material in a high-temperature state as described above, a heater may be provided around the nozzle 61.

As the principal material of the modeled substance, instead of the above-described thermoplastic material, for example, the following metallic materials may also be used. In this case, it is desirable to mix a component that is plasticized and melted at the time of generating the modeling material with a powder-form material formed by powdering the following metallic material and supply the mixture to the generation portion 30 as the material MR.

Examples of Metallic Material

Pure metal such as magnesium (Mg), iron (Fe), cobalt (Co), chromium (Cr), aluminum (Al), titanium (Ti), copper (Cu), or nickel (Ni) or alloys containing one or more thereof Examples of the Alloy Maraging steel, stainless steel, cobalt chromium molybdenum steel, a titanium alloy, a nickel alloy, an aluminum alloy, a cobalt alloy, and a cobalt chromium alloy As the principal material of the modeled substance, it is also possible to use a ceramic material instead of the above-described metallic material. As the ceramic material, for example, oxide ceramics such as silicon dioxide, titanium dioxide, aluminum oxide, and zirconium oxide, non-oxide ceramics such as aluminum nitride, and the like can be used. In a case where the above-described metallic material or ceramic material is used as the principal material, the modeling material disposed on the table 110 may also be cured by sintering.

The powder-form material of the metallic material or the ceramic material that is injected into the material supply source 21 as the material MR may be a mixed material obtained by mixing a plurality of kinds of powders of pure metals, powders of alloys, or powder of ceramic materials. In addition, the powder-form material of the metallic material or the ceramic material may be coated with, for example, a thermoplastic resin as exemplified above or a thermoplastic resin that is not exemplified above. In this case, the thermoplastic resin may melt and develop fluidity in the generation portion 30.

To the powder-form material of the metallic material or the ceramic material that is injected into the material supply source 21 as the material MR, it is possible to add, for example, a solvent as described below. As the solvent, it is possible to use one or more in combination selected from the following.

Examples of Solvent

Water, (poly)alkylene glycol monoalkyl ethers such as ethylene glycol monomethyl ether, ethylene glycol monoethyl ether, propylene glycol monomethyl ether, and propylene glycol monoethyl ether, acetic acid esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkyl ammonium acetates, sulfoxide-based solvents such as dimethyl sulfoxide and diethyl sulfoxide, pyridine-based solvents such as pyridine, γ-picoline, and 2,6-lutidine, ionic liquids such as tetraalkylammonium acetates (for example, tetrabutylammonium acetate and the like) and butyl carbitol acetate, and the like Additionally, to the powder-form material of the metallic material or the ceramic material that is injected into the material supply source 21 as the material MR, it is also possible to add, for example, a binder as described below.

Examples of Binder

An acrylic resin, an epoxy resin, a silicone resin, a cellulose-based resin, other synthetic resins, polylactic acid (PLA), polyamide (PA), polyphenylene sulfide (PPS), polyether ether ketone (PEEK), or other thermoplastic resins

1-6. Overview of First Embodiment

As described above, according to the plasticizing device 10A of the first embodiment, the protrusion and recess structures 70A provided on the side surfaces 42s of the scroll grooves 42 smoothen the lead of the material MR in the scroll grooves 42, and thus it is possible to stably plasticize the material MR. Therefore, the supply of the modeling material to the ejection portion 60 in the generation portion 30 is stabilized, the ejection of the modeling material from the ejection portion 60 is stabilized, and the modeling accuracy of the modeled substance by the modeling device 100 is increased. Additionally, the plasticizing device 10A of the first embodiment and the modeling device 100 including the plasticizing device, a variety of actions and effects described in the first embodiment can be exhibited.

2. A Variety of Embodiments in which Protrusion and Recess Structure is Provided in Scroll Groove Hereinafter, configuration examples in which the configuration of the protrusion and recess structure 70A in the scroll groove 42 of the plasticizing device 10A of the first embodiment is modified will be described as a second embodiment to an eighth embodiment, and a configuration example in which the protrusion and recess structure is added to a bottom surface of the scroll grooves 42 will be described as a ninth embodiment. Regarding the configurations of plasticizing devices 10B to 10I in the respective embodiments below, any configuration that will not be described is identical to the configuration of the plasticizing device 10A of the first embodiment and is mounted in the modeling device 100 described in the first embodiment. In the respective examples below, any configurational portion that is common with that of the first embodiment will be described by giving the same reference sign as in the first embodiment. In the configurations of the respective embodiments below, any configuration that is common with that of the first embodiment is capable of exhibiting a variety of actions and effects that are identical to those described in the first embodiment.

2-1. Second Embodiment

Figure 6:
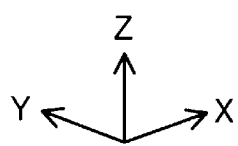
FIG. 6 is a schematic perspective view showing a protrusion and recess structure provided on a side surface of a scroll groove of a second embodiment.
Figure 6:
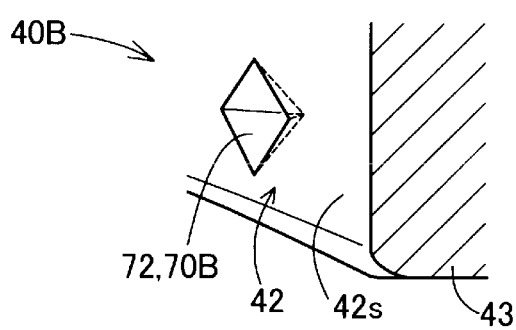

FIG. 6 is a schematic perspective view showing a recess portion 72 that configures a protrusion and recess structure 70B provided on the side surface 42s of the scroll groove 42 in a flat screw 40B that a plasticizing device 10B of a second embodiment includes. The recess portion 72 is different from the recess portion 71 in the first embodiment in terms of the fact that the recess portion is configured of a square pyramid-shaped hollow portion. In the second embodiment, the opening of the recess portion 72 has a square shape. More specifically, the opening of the recess portion 72 has a tetragonal shape. The dimension of one side of the opening of the recess portion 72 may be set to, for example, 1 mm or less. In this case, the area of the opening of the recess portion 72 is 1 mm$^2$ or less. The protrusion and recess structure 70B of the second embodiment is also, similar to the protrusion and recess structure 70A of the first embodiment, capable of smoothening the lead of the material MR by the scroll grooves 42.

2-2. Third Embodiment

Figure 7:
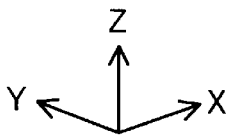
FIG. 7 is a schematic perspective view showing a protrusion and recess structure provided on a side surface of a scroll groove of a third embodiment.
Figure 7:
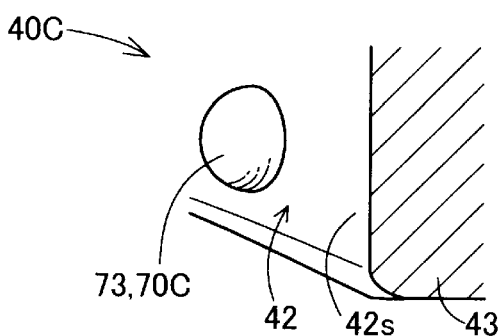

FIG. 7 is a schematic perspective view showing a protrusion portion 73 that configures a protrusion and recess structure 70C provided on the side surface 42s of the scroll groove 42 in a flat screw 40C that a plasticizing device 10C of a third embodiment includes. In the third embodiment, the protrusion and recess structure 70C configured as a protrusion and recess surface including a plurality of the protrusion portions 73 is provided on the side surface 42s of the scroll groove 42 in the flat screw 40C. The configuration of the protrusion and recess structure 70C of the third embodiment is almost identical to that described in the first embodiment except for the fact that the recess portions 71 described in the first embodiment are substituted into the protrusion portions 73. Each recess portion 73 that configures the protrusion and recess structure 70C is a portion that locally protrudes from the side surface 42s that is the criterion surface configuring a continuous curved surface from the open end portion 44 of the scroll groove 42 toward the central portion 46. In the third embodiment, the protrusion portion 73 is configured as a semispherical protrusion portion that protrudes from the side surface 42s that is a flat surface on the circumferential edge. Even such a protrusion portion 73 is capable of increasing resistance between the side surface 42s of the scroll groove 42 and the material MR supplied into the scroll groove 42. Therefore, it is possible to smoothly lead the material MR to the central portion 46 of the flat screw 40C, and the staying of the material MR in the scroll grooves 42 is suppressed. In addition, the material MR in the scroll grooves 42 is stirred by the protrusion portions 73, and thus the degree of kneading of a modeling material to be generated increases. Furthermore, the protrusion portions 73 provided in the circumferential edges of the material introduction portions 44 of the flat screw 40C cause the material MR to be stuck to the protrusion portions 73 and be likely to be drawn into the scroll grooves 42. Therefore, the material MR is caused to smoothly flow into the scroll grooves 42. Additionally, the protrusion portions 73 on the side surfaces 42s of the scroll grooves 42 crush clusters formed by agglomerating pellets of the material MR or a granular raw material, and thus the more stabilized plasticizing of the material MR is realized.

2-3. Fourth Embodiment

Figure 8:
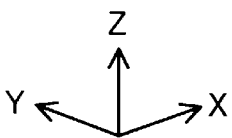
FIG. 8 is a schematic expanded view of a side surface of a scroll groove provided with a protrusion and recess structure of a fourth embodiment.
Figure 8:
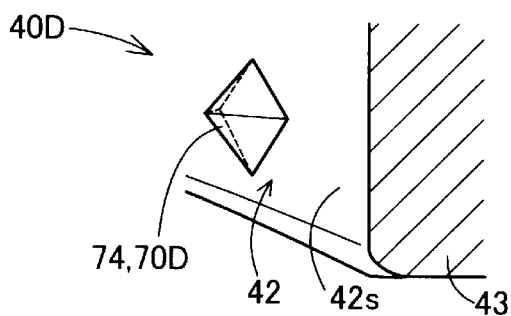

FIG. 8 is a schematic perspective view showing a protrusion portion 74 that configures a protrusion and recess structure 70D provided on the side surface 42s of the scroll groove 42 in a flat screw 40D that a plasticizing device 10D of a fourth embodiment includes. The protrusion portion 74 is different from the protrusion portion 73 in the third embodiment in terms of the fact that the protrusion portion is configured as a square pyramid-shaped protrusion portion that protrudes from the flat surface on the circumferential edge. A base end portion of the protrusion portion 74 of the fourth embodiment has a square like outer circumferential shape. More specifically, the base end portion of the protrusion portion 74 of the fourth embodiment has a tetragonal outer circumferential shape. The dimension of one side of the base end portion of the protrusion portion 74 in the outer circumference may be set to, for example, 1 mm or less. The protrusion and recess structure 70D of the fourth embodiment is also, similar to the protrusion and recess structure 70C of the third embodiment, capable of smoothening the lead of the material MR by the scroll grooves 42. In addition, the pointed front end portions of the protrusion portions 74 are capable of more finely crushing clusters formed by agglomerating pellets of the material MR or a granular raw material.

2-4. Fifth Embodiment

Figure 9:
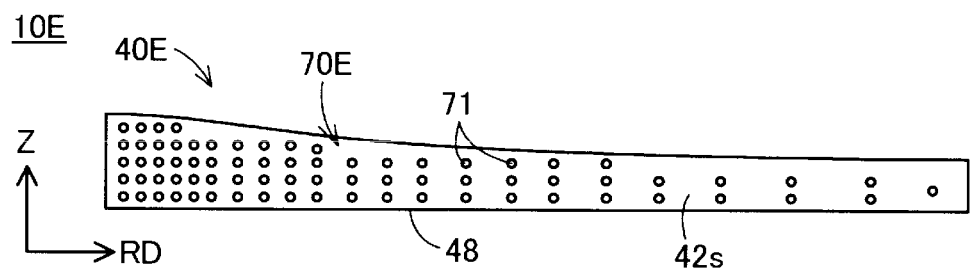
FIG. 9 is a schematic expanded view of a side surface of a scroll groove provided with a protrusion and recess structure of a fifth embodiment.

FIG. 9 is a schematic view showing in an expanded manner an arbitrary one of the side surfaces 42s of the scroll grooves 42 in a flat screw 40E that a plasticizing device 10E of a fifth embodiment includes. In FIG. 9, an arrow RD that indicates a direction from the material introduction portion 44 side of the scroll groove 42 toward the central portion 46 side is shown together with an arrow Z. Hereinafter, the direction indicated by the arrow RD will also be referred to as "flow path direction RD" in the scroll groove 42, the material introduction portion 44 side in the flow path direction RD will be referred to as "upstream", and the central portion 46 side will be referred to as "downstream".

The configuration of a protrusion and recess structure 70E provided on the side surface 42s of the scroll groove 42 in the fifth embodiment is almost identical to the configuration of the protrusion and recess structure 70A described in the first embodiment except for the fact that the distribution of the plurality of recess portions 71 is different from that in the first embodiment. The protrusion and recess structure 70E of the fifth embodiment is configured so that the plurality of recess portions 71 is distributed to become denser from the central portion 46 toward the material introduction portion 44, that is, from the downstream toward the upstream in the flow path direction RD. In the protrusion and recess structure 70E of the fifth embodiment, the number of the recess portions 71 that are included in a unit area increases from the central portion 46 side toward the material introduction portion 44 side. In the protrusion and recess structure 70E of the fifth embodiment, it may be said differently that the intervals between the recess portions 71 adjacent to each other decrease from the central portion 46 side toward the material introduction portion 44 side.

In the flat screw 40E having the protrusion and recess structures 70E of the fifth embodiment, the recess portions 71 become denser toward the material introduction portion 44, and thus it becomes easier for the material MR to fall into the scroll grooves 42, and the material MR is caused to more smoothly flow into the scroll grooves 42. In addition, the number of the recess portions 71 decreases and the area of the space in the scroll groove 42 decreases toward the central portion 46, and thus it is possible to increase the pressure in the scroll grooves 42 toward the central portion 46, and it is possible to favorably eject the modeling material from the communication hole 56.

In other embodiments, the recess portion 71 may be substituted into the recess portion 72 described in the second embodiment. In addition, the recess portion 71 may be substituted into the protrusion portion 73 or 74 described in the third embodiment or the fourth embodiment. Even when the recess portion 71 is substituted into the protrusion portion 73 or 74, it is possible to smoothen the inflow of the material MR from the material introduction portions 44 toward the scroll grooves 42. In addition, when the recess portion 71 is substituted into the protrusion portion 73 or 74, the number of the protrusion portions 73 or 74 decreases toward the central portion 46, and the resistance in the flow path in the scroll groove 42 decreases, and thus it is possible to increase the pressure in the scroll grooves 42 toward the central portion 46.

2-5. Sixth Embodiment

Figure 10:
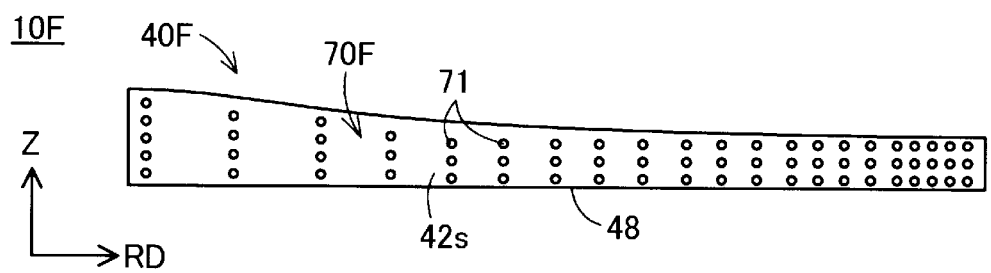
FIG. 10 is a schematic expanded view of a side surface of a scroll groove provided with a protrusion and recess structure of a sixth embodiment.

FIG. 10 is a schematic view showing in an expanded manner an arbitrary one of the side surfaces 42s of the scroll grooves 42 in a flat screw 40F that a plasticizing device 10F of a sixth embodiment includes. In FIG. 10, similar to FIG. 9, the arrow RD is shown together with the arrow Z. The configuration of a protrusion and recess structure 70F provided on the side surface 42s of the scroll groove 42 in the sixth embodiment is almost identical to the configuration of the protrusion and recess structure 70A described in the first embodiment except for the fact that the distribution of the plurality of recess portions 71 is different from that in the first embodiment.

The protrusion and recess structure 70F of the sixth embodiment is configured so that the plurality of recess portions 71 is distributed to become denser from the material introduction portion 44 toward the central portion 46, that is, from the upstream toward the downstream in the flow path direction RD. In the protrusion and recess structure 70F of the sixth embodiment, the number of the recess portions 71 that are included in a unit area increases from the material introduction portion 44 side toward the central portion 46 side. In the protrusion and recess structure 70F of the sixth embodiment, it may be said differently that the intervals between the recess portions 71 adjacent to each other decrease from the material introduction portion 44 side toward the central portion 46 side.

In the flat screw 40F having the protrusion and recess structures 70F of the sixth embodiment, the protrusion portions 71 become denser toward the central portion 46, and thus it is possible to smoothly lead the material MR that becomes more fluid on the downstream of the scroll groove 42 to the central portion 46 by the progress of plasticization. In other embodiments, the recess portion 71 may be substituted into the recess portion 72 described in the second embodiment or the protrusion portion 73 or 74 described in the third embodiment or the fourth embodiment. Even in such a case, it is possible to exhibit the same actions and effects described in the sixth embodiment.

2-6. Seventh Embodiment

Figure 11:
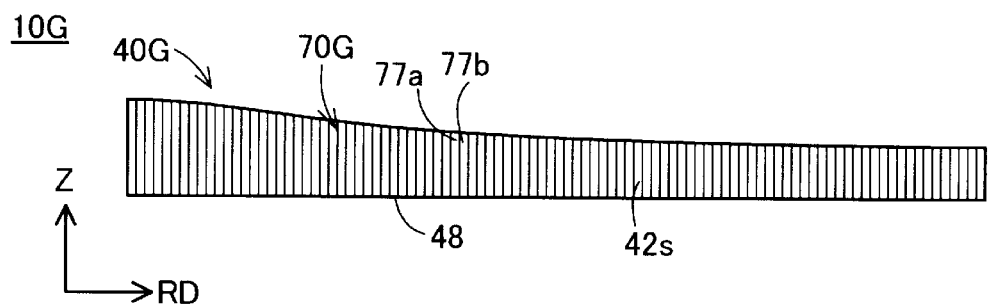
FIG. 11 is a schematic expanded view of a side surface of a scroll groove provided with a protrusion and recess structure of a seventh embodiment.

FIG. 11 is a schematic view showing in an expanded manner an arbitrary one of the side surfaces 42s of the scroll grooves 42 in a flat screw 40G that a plasticizing device 10G of a seventh embodiment includes. In FIG. 11, similar to FIG. 10, the arrow RD is shown together with the arrow Z. In the seventh embodiment, the protrusion and recess structure 70G provided on the side surface 42s of the scroll groove 42 is configured of a protrusion and recess surface in which recess portions 77a and protrusion portions 77b that are linear along the Z direction are alternately repeated in the flow path direction RD.

In the seventh embodiment, the widths of the respective recess portions 77a in the flow path direction RD are uniform, and the widths of the respective protrusion portions 77b in the flow path direction RD are uniform. The widths of the respective recess portions 77a and the respective protrusion portions 77b in the flow path direction RD may be set to, for example, 1 mm or less. In the seventh embodiment, the protrusion and recess structure 70G is formed throughout the entire side surface 42s in the flow path direction RD. The protrusion and recess structure 70G can be formed by a machining process or a discharging process on the side surface 42s. Even the above-described protrusion and recess structure 70G smoothens the lead of the material MR by the scroll grooves 42.

In other embodiments, the protrusion and recess structure 70G may be configured so that pitches of the recess portions 77a or the protrusion portions 77b arranged decrease from the material introduction portion 44 toward the central portion 46 so that the recess portions or the protrusion portions become denser from the material introduction portion toward the central portion 46. Alternatively, the protrusion and recess structure 70G may be configured so that the pitches of the recess portions 77a or the protrusion portions 77b arranged decrease from the central portion 46 toward the material introduction portion 44 so that the recess portions or the protrusion portions become denser from the central portion 46 toward the material introduction portion 44. In addition, in other embodiments, the protrusion and recess structure 70G may be provided only in a partial region of the side surfaces 42s.

2-7. Eighth Embodiment

Figure 12:
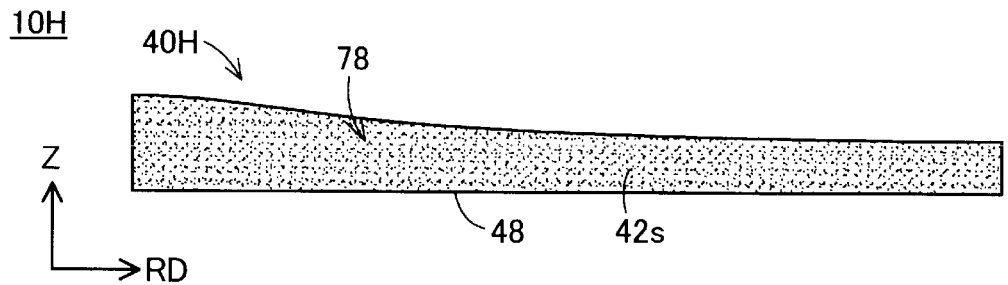
FIG. 12 is a schematic expanded view of a side surface of a scroll groove provided with a protrusion and recess structure of an eighth embodiment.

FIG. 12 is a schematic view showing in an expanded manner an arbitrary one of the side surfaces 42s of the scroll grooves 42 in a flat screw 40H that a plasticizing device 10H of an eighth embodiment includes. In FIG. 12, similar to FIG. 11, the arrow RD is shown together with the arrow Z.

In the respective embodiments described above, the protrusion and recess structures 70A to 70G that the side surfaces 42s of the scroll grooves 42 have are formed by modeling a plurality of concave or convex structures. In contrast, in the eighth embodiment, a protrusion and recess structure that the side surfaces 42s of the scroll grooves 42 have is configured of a fine surface structure 78 formed by adjusting the surface texture of the side surface 42s with a surface machining treatment. In FIG. 12, the surface structure 78 is schematically shown using hatching.

In the eighth embodiment, the side surface 42s of the scroll groove 42 is configured of the surface structure 78 having a surface roughness Ra of 20 μm and a height roughness Rz of 60 μm. The surface structure 78 can be formed by, for example, ordinary arc discharging using arc discharging. In addition, the surface structure 78 can also be formed by a blast treatment. Since it becomes easy for solid-form portions that are included in the material MR while being plasticized to be stuck to the side surfaces 42s having the surface structure 78, it becomes possible to smoothly lead the material MR using the scroll grooves 42, and the staying of the material MR in the scroll grooves 42 is suppressed.

In the present specification, the surface roughness Ra refers to the arithmetic average roughness according to JIS standards (JIS B 0601:2013), and the height roughness Rz refers to the maximum height roughness according to the same JIS standards. The roughness of the surface structure 78 is not limited to the surface roughness Ra and the height roughness Rz and can be regulated using a variety of parameters according to JIS standards (JIS B 0601:2013) such as the root mean square roughness Rq, the maximum profile valley depth Rv, and the maximum profile peak height Rp. In addition, in other embodiments, the surface roughness Ra of the surface structure 78 is not limited to 20 µm, and the height roughness Rz is not limited to 60 µm. The surface roughness Ra may be adjusted to 20 µm or more, and the height roughness Rz may be adjusted to 60 µm or more. Alternatively, the surface roughness Ra may be adjusted to 20 µm or more, and the height roughness Rz may be adjusted to less than 60 µm. When the surface roughness Ra is 20 µm or more, it is possible to cause the material MR that has been plasticized and more fluid to be likely to follow the flow path by the rotation of the flat screw 40H. In other embodiments, the surface roughness Ra of the surface structure 78 may be adjusted so that the protrusions and the recesses become denser from the central portion 46 toward the material introduction portion 44 or, inversely, may be adjusted so that the protrusions and the recesses become denser from the material introduction portion 44 toward the central portion 46. In addition, the surface structure 78 may be provided only in a partial region of the side surfaces 42s.

2-8. Ninth Embodiment

Figure 13:
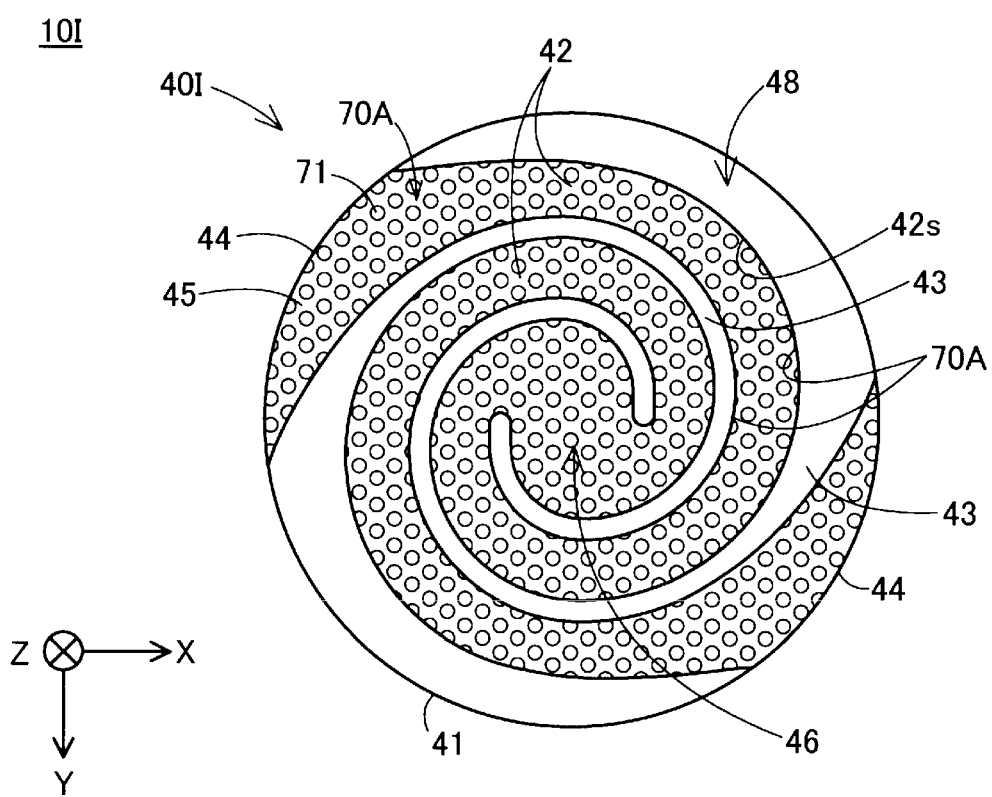
FIG. 13 is a schematic plan view showing a configuration of a flat screw of a ninth embodiment.

FIG. 13 is a schematic plan view showing a lower surface 48 side of a flat screw 40I that a plasticizing device 10I in the ninth embodiment includes. The configuration of the plasticizing device 10I of the ninth embodiment is almost identical to the flat screw 40A of the first embodiment except for the fact that the protrusion and recess structure 70A is not added to the bottom surface 45 of the scroll groove 42 of the flat screw 40I. The protrusion and recess structure 70A on the bottom surface 45 is configured of a protrusion and recess surface including the recess portions 71 that are hollow from the bottom surface 45 that is a criterion surface continuing from the material introduction portions 44 through the central portion 46. According to the plasticizing device 10I of the ninth embodiment, the protrusion and recess structures 70A are provided not only on the side surfaces 42s of the scroll grooves 42 but also on the bottom surface 45, and thus the lead of the material MR by the scroll grooves 42 is further smoothened. In other embodiments, instead of the same protrusion and recess structure 70A as in the first embodiment, a different protrusion and recess structure may be provided on the bottom surface 45 of the scroll grooves 42. On the bottom surface 45 of the scroll grooves 42, for example, the protrusion and recess structures 70B to 70I described in the respective embodiments other than the first embodiment may be provided. In addition, the bottom surface 45 of the scroll grooves 42 may have the surface structure 78 as described in the eighth embodiment. In addition, in other embodiments, on the side surfaces 42s of the scroll grooves 42, instead of the protrusion and recess structure 70A of the first embodiment, the protrusion and recess structures 70B to 70I described in the respective embodiments other than the first embodiment may be provided. Alternatively, the side surfaces 42s of the scroll grooves 42 may have the surface structure 78 described in the eighth embodiment.

3. Various Embodiments Using Changes in Dimensions of Scroll Groove

Hereinafter, embodiments for smoothening the lead and plasticization of the material MR in the scroll grooves 42 by changing the dimensions of the scroll groove 42 instead of using the protrusion and recess structures formed on the side surfaces 42s of the scroll grooves 42 as described in the respective embodiments will be described. The configurations of plasticizing devices 10J and 10K in the following tenth embodiment and eleventh embodiment are identical to the configuration of the plasticizing device 10A of the first embodiment except for the fact that the protrusion and recess structures 70A are not provided on the side surfaces 42s of the scroll grooves 42. The plasticizing devices 10J and 10K in the tenth embodiment and the eleventh embodiment are mounted in the modeling device 100 described in the first embodiment. In the respective examples below, any configurational portion that is common with that of the first embodiment will be described by giving the same reference sign as in the first embodiment. In the configurations of the respective embodiments below, any configuration that is common with that of the first embodiment is capable of exhibiting a variety of actions and effects that are identical to those described in the first embodiment.

3-1. Tenth Embodiment

Figures 14A, 14B:
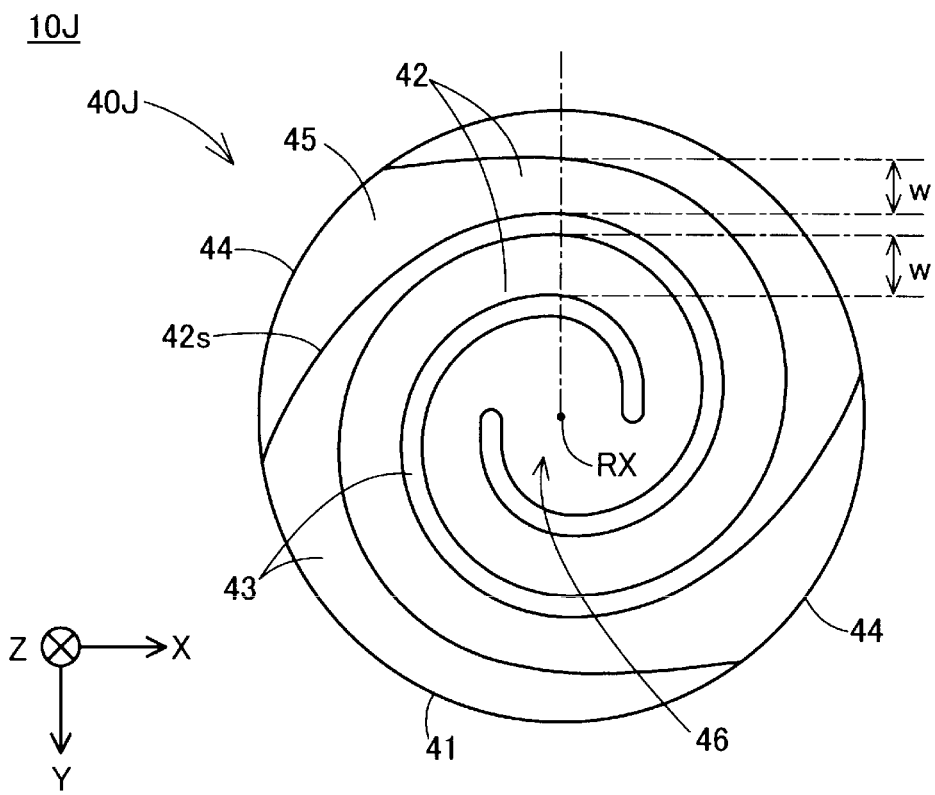
FIG. 14A is a schematic plan view showing a configuration of a flat screw of a tenth embodiment.
FIG. 14B is an explanatory view showing experimental results of the tenth embodiment.

FIG. 14A is a schematic plan view showing the groove-formed surface 48 of a flat screw 40J that the plasticizing device 10J of the tenth embodiment includes. Similar to the flat screw described in the first embodiment, the flat screw 40J includes two scroll grooves 42. In addition, the width of the scroll groove 42 decreases toward the central portion 46 in an inlet portion near the material introduction portion 44 and is maintained almost uniform through the central portion 46 on the central portion 46 side of the inlet portion.

Here, the flat screw 40J has a portion in which n scroll grooves having a width w are arrayed in the radial direction. Here, the number n of the scroll grooves 42 is added even when the same scroll groove 42 revolves and is arrayed in parallel. In the flat screw 40J, the relationship of the following inequality expression (1) is satisfied in the portion in which n scroll grooves 42 having a width w are arrayed.

$$0.43 < n \times w/r < 1.00 \qquad (1)$$

In the plasticizing device 10J, when the width w of the scroll groove is adjusted to a value that satisfies the inequality expression (1) in the portion in which n scroll grooves 42 having a width w are arrayed, the material MR is smoothly led and plasticized in the scroll grooves 42 as shown by the following experimental results.

Figure 14C:
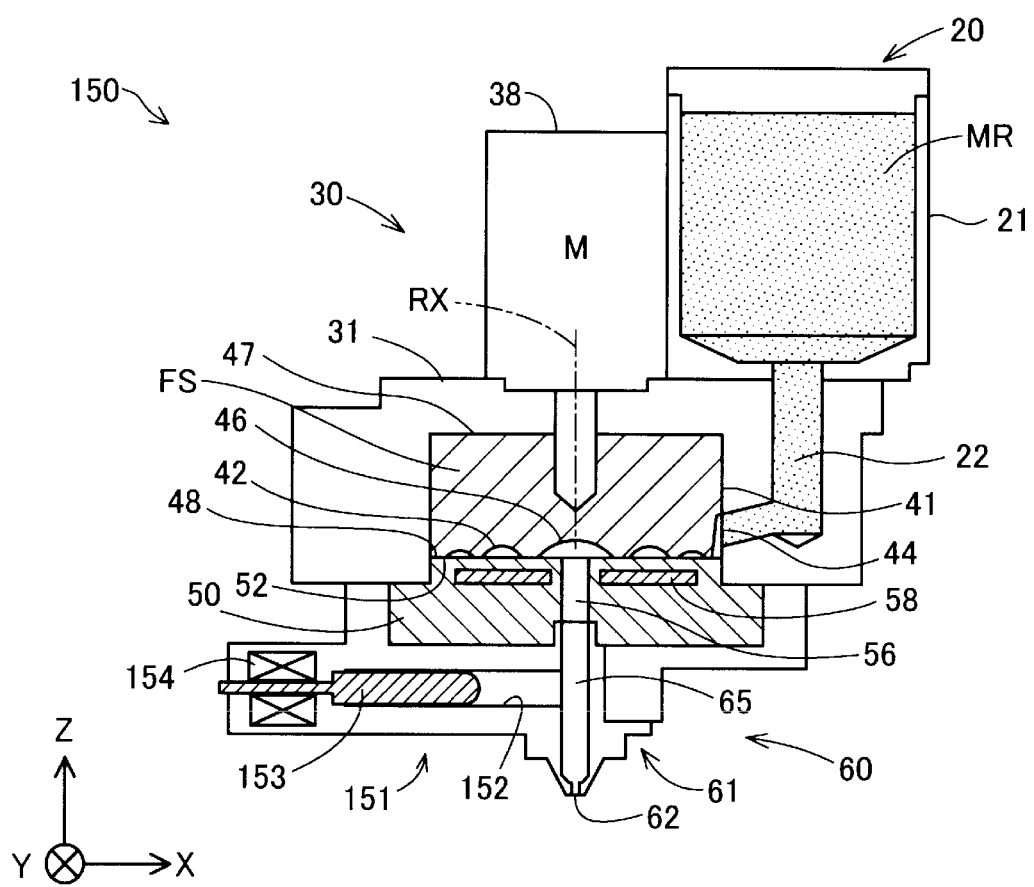
FIG. 14C is a schematic view showing a configuration of an ejecting device for measuring an ejection device for measuring an ejection percentage.

FIG. 14B is an explanatory view showing experimental results obtained by measuring the ejection percentages of a modeling material in an ejection device 150 in which flat screw samples S1 to S3 having scroll grooves with different widths w are used. FIG. 14C is a schematic view showing a configuration of the ejection device 150 used in the experiments. The ejection percentages of the modeling material measured in the experiments will be described after the configuration of the ejection device 150 is described.

The ejection device 150 includes the supply portion 20, the generation portion 30, the ejection portion 60, and an ejection amount adjustment portion 151. The supply portion 20 has almost the same configuration as that described in the first embodiment. The generation portion 30 has almost the same configuration as that described in the first embodiment except for the fact that a flat screw sample FS is mounted therein. The sample FS has a configuration of scroll grooves as shown in FIG. 14A. The ejection portion 60 has almost the same configuration as that described in the first embodiment except for the fact that the ejection amount adjustment portion 151 is connected thereto.

The ejection amount adjustment portion 151 is a mechanism for adjusting the amount of a modeling material that is ejected from the ejection opening 62 in the ejection portion 60. The ejection amount adjustment portion 151 includes a cylinder 152 that is connected to the flow path 65 in the ejection portion 60, a plunger 153 that reciprocally moves in the cylinder 152, and a plunger driving portion 154 that drives the plunger 153.

In the ejection device 150, the plunger 153 is instantly moved in a direction away from the flow path 65 at a predetermined rate as far as a movement distance according to the target ejection amount at a predetermined timing after the beginning of the supply of the material MR from the supply portion 20 by rotating the flat screw sample FS at a predetermined rotation rate. This movement of the plunger 153 generates a negative pressure in the flow path 65 and causes the modeling material to flow into the cylinder 153. After that, the plunger 153 is pressed back to face the flow path 65, whereby the modeling material that has fallen into the cylinder 153 is ejected from the ejection opening 62 of the nozzle 61.

The "ejection percentage of the modeling material" refers to the percentage of the ejection amount of the modeling material actually ejected from the nozzle 61 with respect to the preset target ejection amount. When the material MR is not smoothly led and plasticized in the scroll grooves of the flat screw, the amount of the modeling material caused to falls into the cylinder 152 by the movement of the plunger 153 decreases. Therefore, the amount of the modeling material that is pressed out from the cylinder 152 by the plunger 153 and is ejected from the ejection opening 62 decreases. Inversely, the more smoothly the material MR is led and plasticized in the scroll grooves of the flat screw, the more amount of the modeling material falls into the cylinder 152 by the movement of the plunger 153, and the more amount of the modeling material is ejected from the ejection opening 62. That is, the more smoothly the material MR is led and plasticized in the scroll grooves of the flat screw, the more the ejection percentage of the modeling material increases.

Here, in the experiments, the following samples S1 to S3 were used as the samples FS. The radii of flat screws of the respective samples S1 to S3 are 40.0 mm. In addition, in the respective samples S1 to S3, in a portion in which two scroll grooves having the same width are arrayed in the radial direction of the flat screw, the widths w of the respective scroll grooves are adjusted to 8.6 mm, 9.6 mm, and 7.6 mm. Compared with the width w of the scroll groove in the sample S1, the width w of the scroll groove in the sample S2 is 1 mm larger, and the width w of the scroll groove in the sample S3 is 1 mm smaller.

In these experiments, the ejection percentages of the modeling material were measured 20 times respectively when pellet-shaped PP was used as an example of a hard material and a case where pellet-shaped TPU was used as an example of a material having a high elastic modulus. In FIG. 14B, the average value of these measured results are shown as "average ejection rate (%)". The average ejection rate indicates that, as the value increases, the material is more smoothly sent in the scroll grooves, and the material is more smoothly plasticized.

As shown in FIG. 14B, in the sample S2 in which the n×w/r value was 0.48 and the inequality expression (1) was satisfied, the average ejection percentage exceeded 83% in the case of using PP as the material, and the average ejection percentage exceeded 70% in the case of using TPU as the material. In contrast, in the sample S1 in which the n×w/r value was 0.43, the average ejection percentage exceeded 80% in the case of using PP as the material, but the average ejection percentage was 56% that was lower than that of the sample S3 in the case of using TPU as the material. In addition, in the sample S3 in which the n×w/r value was 0.38, the average ejection percentages were values lower than 70% in both cases of using PP and TPU.

As described above, in the sample S2 in which the n×w/r value was larger than 0.43, high material ejection percentages were measured in both cases of using the hard pellet-shaped material and the pellet-shaped material having a high elastic modulus. In addition, in the sample S2 in which the n×w/r value was larger than 0.43, for the pellet-shaped material having a high elastic modulus, the average ejection percentage improves by 20% or more compared with the sample S1 in which the n×w/r value was 0.43, which indicates that a stronger effect can be obtained. From these results, it is found that, when the width of the scroll groove is set to be as large as possible with respect to the radius of the flat screw so that the n×w/r value becomes larger than 0.43 in the portion in which n scroll grooves having a width w are arrayed in the radial direction of the flat screw, it is possible to smoothly lead and plasticize the material in the scroll grooves.

As described above, in the plasticizing device 10J of the tenth embodiment, the flat screw 40J has a portion in which the width w of the scroll groove 42 is adjusted so as to satisfy the inequality expression (1). Therefore, as shown by the experiment results in FIG. 14B, the lead and plasticization of the material MR in the scroll grooves 42 are smoothened. In addition, according to the modeling device 100 including the plasticizing device 10J of the tenth embodiment, the modeling material is stably supplied from the plasticizing device 10J, and thus the accuracy of a modeling treatment increases. Additionally, according to the plasticizing device 10J of the tenth embodiment and the modeling device 100 including the plasticizing device, it is possible to obtain a variety of actions and effects that are identical to those described in the respective embodiments due to the configuration common with the respective embodiments.

3-2. Eleventh Embodiment

Figures 15A, 15B:
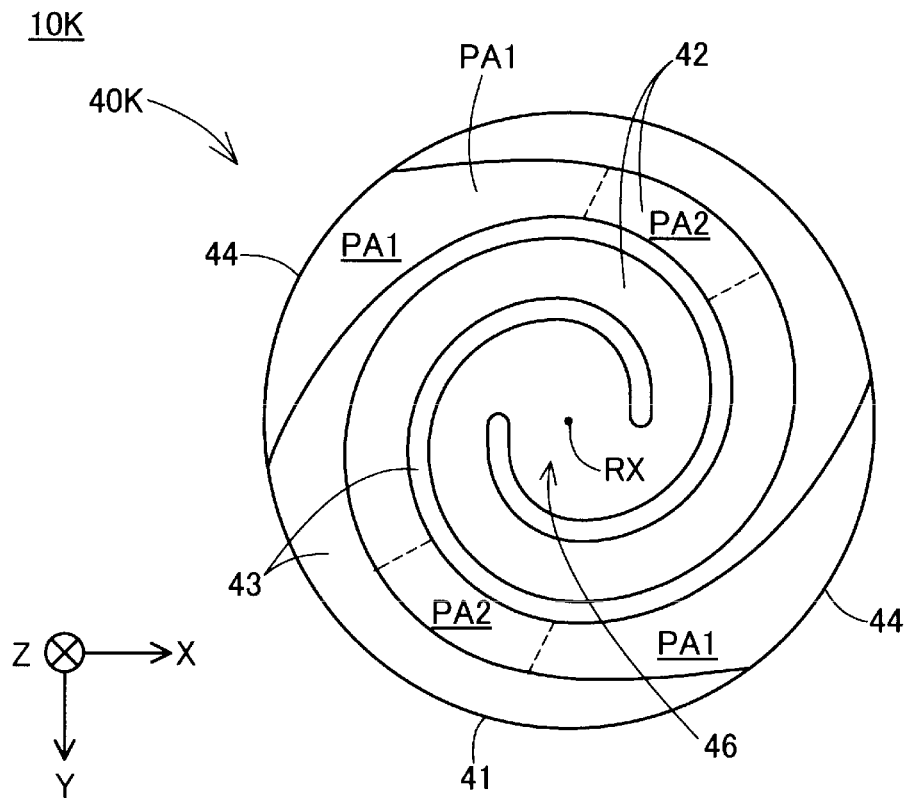
FIG. 15A is a schematic plan view showing a configuration of a flat screw of an eleventh embodiment.
FIG. 15B is an explanatory view showing experimental results of the eleventh embodiment.

FIG. 15A is a schematic plan view showing the groove-formed surface 48 of a flat screw 40K that the plasticizing device 10K of the eleventh embodiment includes. Here, the length of the flow path of the scroll groove 42 is represented by R. The length of the flow path R corresponds to the length of the central axis of the scroll groove 42 which passes through the center in the width direction of the scroll groove 42 from the material injection portion 44 to the center of the groove-formed surface 48. FIG. 15A shows a region PA1 from the material introduction portion 44 through a location of 25% of the length of the flow path R and a region PA2 from the material introduction portion 44 through a location of 45% of the length of the flow path R by dividing the regions using a broken line for convenience. The two regions PA1 and PA2 are both regions closer to the material introduction portion 44 than the central portion 46 in the scroll groove 42.

Here, the depth of the scroll groove 42 at the open end portion 44 of the scroll groove 42 is represented by Da, and the depth of the scroll groove 42 at the center of the groove-formed surface 48 is represented by db. The depth db corresponds to the depth of the central portion 46 in the center of the flat screw 40K. In the flat screw 40K of the eleventh embodiment, regarding the depth of the scroll groove 42, the relationship of the following inequality expression (2) is satisfied.

$$Da/db > 6.82 \quad (2)$$

FIG. 15B is an explanatory view showing experimental results obtained by measuring the ejection percentages of the modeling material in the ejection device 150 in which flat screw samples S1, S4, and S5 having scroll grooves with different depths are used. The configuration of the ejection device 150 used in these experiments is almost identical to the configuration of the ejection device 150 shown in FIG. 14C described in the tenth embodiment. In these experiments, similar to the experiments described in the tenth embodiment, pellet-shaped PP and TPU were used as materials, the ejection percentages of the modeling material were measured 20 times respectively for both materials, and average values thereof were computed.

In these experiments, the samples S1, S4, and S5 mounted in the ejection device 150 as the samples FS have a common configuration except for the fact that the depths of the scroll grooves were adjusted respectively. The sample S1 is identical to that used in the experiment described in the tenth embodiment.

In the sample S1, the depth Da at the open end portion is 15.0 mm, and the depth is maintained in a region corresponding to the region PA1 shown in FIG. 15A. In the sample S1, in a region corresponding to the region PA2 shown in FIG. 15A, the depth of the scroll groove becomes smaller than 15.0 mm. In the sample S1, the depth db at an end portion on the central portion side of the scroll groove is 2.2 mm.

In the sample S4, the depth Da at the open end portion is 16.0 mm, and the depth is maintained in a region corresponding to the region PA1 shown in FIG. 15A. In the sample S4, in a region corresponding to the region PA2 shown in FIG. 15A, the depth of the scroll groove becomes smaller than 16.0 mm.

In the sample S5, the depth Da at the open end portion is identical to that of the sample S4 and is 16.0 mm. However, in the sample S5, the depth is maintained up to the region corresponding to the region PA2 shown in FIG. 15A, and, on the central portion side of the region PA2, the depth of the scroll groove becomes smaller than 16.0 mm.

As described above, in the samples S4 and S5, the depth at the open end portion of the scroll groove becomes deeper than that of the sample S1. In addition, in the sample S5, the range of the region in which the depth of the scroll groove is deeper than that in the sample S1 is expanded more than in the sample S4. In all of the samples S1, S4, and S5, the depth at the middle location of the scroll groove 42 from the material introduction portion 44 to the central portion 46 was 4.1 mm.

As shown in FIG. 15B, in both of the samples S4 and S5, the Da/db value reach 7.27, and the inequality expression (2) is satisfied. In both of the samples S4 and S5, the average ejection percentage significantly improved compared with that of the sample S1 in the case of using TPU. Particularly, in the sample S5 in which the region in which the depth of the scroll groove became deep even in the region PA2 was enlarged, the average ejection percentages exceeded 75%, and more favorable results than those of the sample S1 were obtained in both cases of using PP and TPU.

From the above-described experimental results, it is found that, when the depth of the scroll groove 42 in the open end portion 44 is significantly adjusted so that the inequality expression (2) is satisfied, it is possible to smoothly lead and plasticize the material MR in the scroll grooves 42. Particularly, it is found that the depth Da of the scroll groove 42 in the open end portion 44 is desirably maintained in the region PA1 and more desirably maintained even in the region PA2.

In the plasticizing device 10K of the eleventh embodiment, the depth of the scroll groove 42 satisfies the inequality expression (2), and thus the material MR is smoothly led and plasticized in the scroll grooves 42. In addition, according to the modeling device 100 including the plasticizing device 10K of the eleventh embodiment, the modeling material is stably supplied from the plasticizing device 10K, and thus the accuracy of a modeling treatment increases. Additionally, according to the plasticizing device 10K of the eleventh embodiment and the modeling device 100 including the plasticizing device, it is possible to obtain a variety of actions and effects that are identical to those described in the respective embodiments due to the configuration common with the respective embodiments.

4. Twelfth Embodiment that is Embodiment of Injection Molding Device

Figure 16:
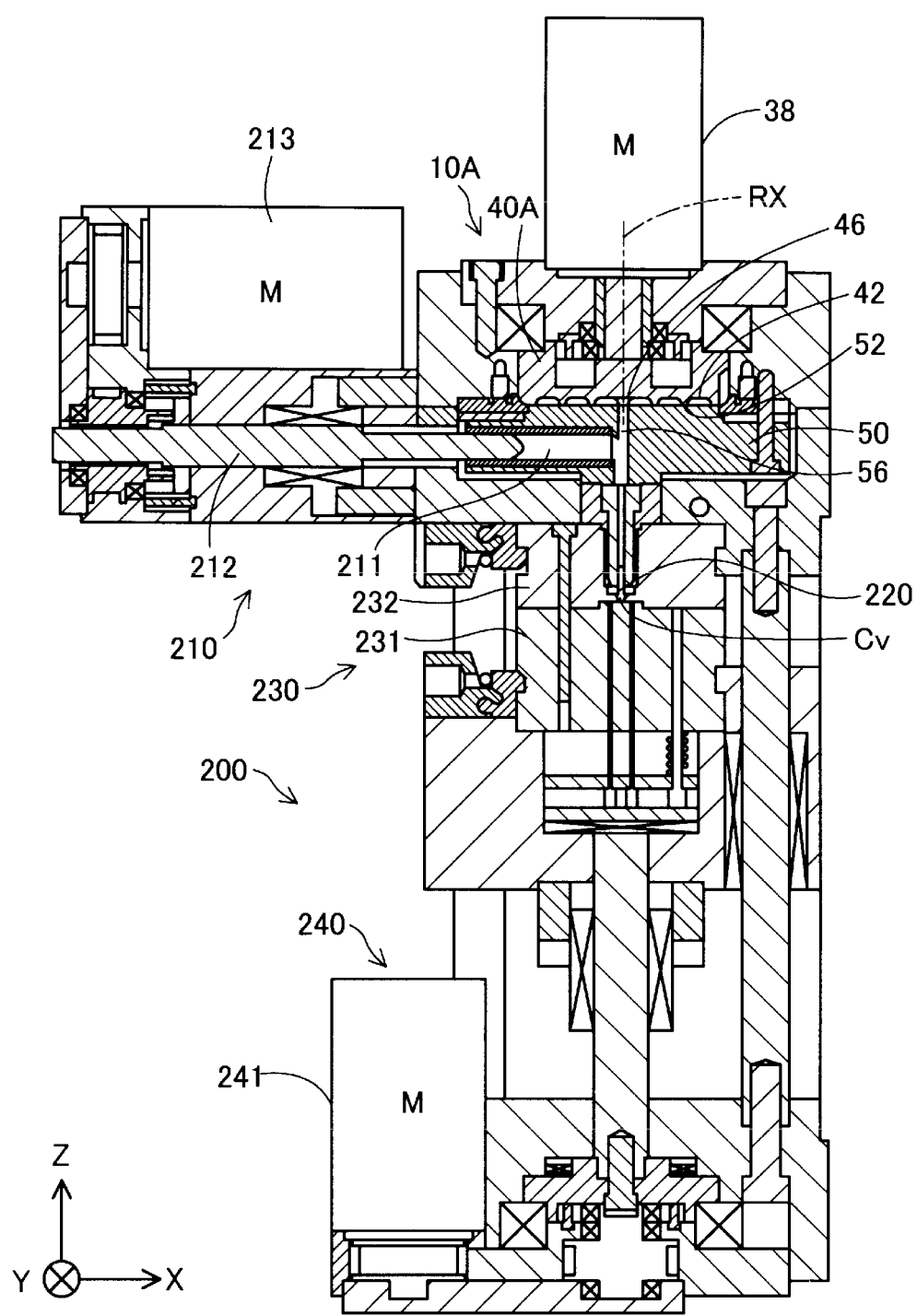
FIG. 16 is a schematic view showing a configuration of an injection molding device in a twelfth embodiment.

FIG. 16 is a schematic configurational view showing a configuration of an injection molding device 200 in a twelfth embodiment by showing some of members in a cross section. The injection molding device 200 of the twelfth embodiment includes the plasticizing device 10A described in the first embodiment, an injection control mechanism 210, a nozzle 220, a mold portion 230, and a mold clamping device 240.

As described in the first embodiment, the plasticizing device 10A has the flat screw 40A and the screw facing portion 50. The specific configurations of the flat screw 40A and the screw facing portion 50 are identical to the configurations of the flat screw 40A and the screw facing portion 50 of the first embodiment. The plasticizing device 10A plasticizes at least some of a granular material supplied to the scroll grooves 42 in the flat screw 40A, generates a fluid pellet-shape modeling material, and leads the modeling material to the injection control mechanism 210 from the communication hole 56.

The injection control mechanism 210 includes an injection cylinder 211, a plunger 212, and a plunger driving portion 213. The injection control mechanism 210 has a function of injecting a plasticized material in the injection cylinder 211 into a cavity Cv described below. The injection control mechanism 210 controls the amount of the material injected from the nozzle 220. The injection cylinder 211 is a substantially cylindrical member connected to the communication hole 56 of the screw facing portion 50 and includes the plunger 212 therein. The plunger 212 slides inside the injection cylinder 211 and sends by pressure the material in the injection cylinder 211 to the nozzle 220 side connected to the plasticizing device 10A. The plunger 212 is driven by the plunger driving portion 213 that is configured of a motor.

The mold portion 230 includes a movable mold 231 and a fixed mold 232. The movable mold 231 and the fixed mold 232 are provided to face each other, and the cavity Cv that is a space corresponding to the shape of a molded article is provided therebetween. Into the cavity Cv, the plasticized material is sent by pressure by the injection control mechanism 210 and injected through the nozzle 220.

The mold clamping device 240 includes a mold driving portion 241 and has a function of opening and closing the movable mold 231 and the fixed mold 232. The mold clamping device 240 drives the mold driving portion 241 to move the movable mold 231 to open and close the mold portion 230.

The injection molding device 200 of the twelfth embodiment includes the plasticizing device 10A having the same configuration as in the first embodiment. Therefore, the protrusion and recess structures 70A provided on the side surfaces 42s of the scroll grooves 42 facilitates the rotational force of the rotating flat screw 40A to be transferred to the material in the scroll grooves 42, and the material is smoothly led by the scroll grooves 42. Therefore, it is possible to stably supply the material from the plasticizing device 10A to the injection cylinder 211 in the injection control mechanism 210, and the occurrence of poor molding in the injection molding device 200 is suppressed. In other embodiments, instead of the plasticizing device 10A of the first embodiment, the plasticizing devices 10B, 10C, 10D, 10E, 10F, 10G, 10H, 10I, 10J, and 10K described in the respective embodiments other than the first embodiment may be mounted in the injection molding device 200.

5. Other Embodiments

A variety of the configurations described in the respective embodiments can be modified, for example, as described below. All of the other embodiments described below are considered as, similar to the respective embodiments described above, an example of an aspect for carrying out a technique of the present disclosure.

(1) Other Embodiment 1

The plasticizing devices 10A to 10K of the respective embodiments may include a screw that includes the scroll grooves 42 and has a length in the Z direction that is longer than the diameter as a rotor instead of the flat screws 40A to 40K. The grooves 42 in the plasticizing devices 10A to 10K of the respective embodiments may not be configured as the scroll groove 42. The groove 42 needs to be along the rotation direction of the rotor. The groove 42 may not run around on the groove-formed surface 48 so as to surround the center of the groove-formed surface 48. In addition, the groove 42 may not have the open end portion 44 as the material introduction portion. In this case, the material introduction portion of the groove 42 may be configured as a through hole that is communicated with the groove 42 from the upper surface 47.

(2) Other Embodiment 2

The plurality of recess portions or the plurality of protrusion portions configuring the protrusion and recess structure that is provided on the side surface 42s of the groove 42 is not limited to the shape of the recess portion 71 or 72 in the first embodiment or the second embodiment or the protrusion portion 73 or 74 described in the third embodiment or the fourth embodiment. For example, the recess portion may be configured as a hollow portion having a triangular pyramid-shaped or cylindrical inner space. The shape of the opening of the recess portion may be, for example, an elliptical shape, a rhombic shape, an oblong shape, a triangular shape, a wedge shape, or a polygonal shape. In addition, the plurality of protrusion portions configuring the protrusion and recess structure that is provided on the side surface 42s may have a shape such as a conical shape, a cylindrical shape, a semi-elliptical shape, a triangular pyramid shape, a rectangular shape, or a plate shape. The dimension of the opening of the recess portion or the maximum value of the width of the protrusion portion at the base end portion may be set to 1 mm or more and may be, for example, approximately 2 to 5 mm. The size of the recess portion or the protrusion portion can be arbitrarily set. The dimension of the opening of the recess portion or the maximum value of the width of the protrusion portion at the base end portion needs to be set so as to be 5% or more and less than 100% of the height of the protrusion ridge portion 43 at a location at which the recess portion or the protrusion portion is formed. The range in which the recess portions or the protrusion portions are formed in the side surface 42s, the number of the recess portions or the protrusion portions, the array intervals between the respective recess portions or the respective protrusion portions, and the array direction thereof are also not particularly limited. In addition, the protrusion and recess structure may be formed only on one side surface 42s of the groove 42.

(3) Other Embodiment 3

In the flat screws 40J and 40K of the tenth embodiment and the eleventh embodiment, the protrusion and recess structures 70A to 70I or the surface structure 78 as described in the respective embodiments may be provided on the side surface 42s or the bottom surface 45 of the scroll groove 42.

(4) Other Embodiment 4

In the respective embodiments described above, the supply portion 20 may have a configuration in which a plurality of hoppers is provided. In this case, different materials may be supplied to the scroll grooves 42 from the respective hoppers and mixed together in the scroll grooves 42, thereby generating a modeling material. For example, the powder material that serves as the principal material described in the above-described embodiment and a solvent, a binder, or the like that is added thereto may be supplied in parallel from separate hoppers to the scroll grooves 42.

(5) Others

In the above-described embodiments, some or all of the functions and the treatments realized using software may also be realized using hardware. In addition, some or all of the functions and the treatments realized using hardware may also be realized using software. As the hardware, it is possible to use, for example, a variety of circuits such as an integrated circuit, a discrete circuit, or a circuit module obtained by combining the above-described circuits.

6. Other Aspects

The technique of the present disclosure is not limited to the respective embodiments or examples described above and can be realized in a variety of aspects within the scope of the gist of the present disclosure. For example, the technique of the present disclosure can be realized in the following aspects. The technical characteristics in the respective embodiments described above which correspond to technical characteristics in individual aspects described below can be appropriately replaced or combined together in order to solve some or all of the problems of the technique of the present disclosure or to achieve some or all of the effects of the technique of the present disclosure. In addition, the technical characteristics can be appropriately deleted unless described as essential in the present specification.

(1) A first aspect is provided as a plasticizing device. This aspect of the plasticizing device includes a driving motor, a rotor that is rotated by the rotation of the driving motor and has a groove-formed surface having a groove formed in a rotation direction, and a barrel that is opposite to the groove-formed surface and has a communication hole and a heater, plasticizes a material supplied between the groove and the barrel by the rotation of the rotor and heating by the heater, and causes the plasticized material to flow out from the communication hole. The side surface of the groove has a protrusion and recess surface including protrusion portions or recess portions. According to this aspect of the plasticizing device, the protrusion and recess surface that the side surface of the groove in the rotor has facilitates the transfer of the rotational force of the rotor to the material in the groove, and thus it is possible to smoothly lead the material using the groove, and it is possible to stably plasticize the material.

(2) In the aspect, the protrusion and recess surface may have a structure in which the recess portions and the protrusion portions formed along the rotation axis of the rotor are alternately repeated in the rotation direction.

According to this aspect of the plasticizing device, it becomes easy for a material to be stuck to the protrusion and recess structure on the side surface of the groove.

(3) In the aspect, the groove is formed in a spiral shape from the outer circumferential end toward the center of the groove-formed surface, and the number of the recess portions or the protrusion portions on the protrusion and recess surface per unit area increases from the center toward the outer circumferential end of the groove-formed surface.

According to this aspect of the plasticizing device, due to the recess portions or the protrusion portions the number of which increases toward the inlet side of the groove, the inflow of the material into the scroll grooves can be accelerated.

(4) In the aspect, the groove is formed in a spiral shape from the outer circumferential end toward the center of the groove-formed surface, and the number of the recess portions or the protrusion portions on the protrusion and recess surface per unit area increases from the outer circumferential end toward the center of the groove-formed surface.

According to this aspect of the plasticizing device, the number of the recess portions or the protrusion portions increases toward the center, and thus it is possible to more smoothly send a material that has been plasticized and more fluid to the communication hole.

(5) A second aspect is provided as a plasticizing device. This aspect of the plasticizing device includes a driving motor, a rotor that is rotated by the rotation of the driving motor and has a groove-formed surface having a groove formed in a rotation direction, and a barrel that is opposite to the groove-formed surface and has a communication hole and a heater, plasticizes a material supplied between the groove and the barrel by the rotation of the rotor and heating by the heater, and causes the plasticized material to flow out from the communication hole. The surface roughness Ra of the side surface of the groove is 20 μm or more.

According to this aspect of the plasticizing device, the surface structure of the side surface of the groove of the rotor facilitates the transfer of the rotational force of the rotor to the material in the groove, and thus it is possible to smoothly lead the material using the groove, and it is possible to stably plasticize the material.

(6) The above-described aspect of the plasticizing device may further have a protrusion and recess surface including protrusion portions or recess portions on the bottom surface of the groove.

According to this aspect of the plasticizing device, the addition of the protrusion and recess surface to the bottom surface of the groove further facilitates the transfer of the rotational force of the rotor to the material in the groove.

(7) A third aspect is provided as a plasticizing device. This aspect of the plasticizing device includes a driving motor, a rotor that is rotated by the rotation of the driving motor and has a groove-formed surface having a groove formed in a rotation direction, and a barrel that is opposite to the groove-formed surface and has a communication hole and a heater, plasticizes a material supplied between the groove and the barrel by the rotation of the rotor and heating by the heater, and causes the plasticized material to flow out from the communication hole. The groove is formed in a spiral shape from the outer circumferential end toward the center of the groove-formed surface, on the groove-formed surface, n grooves having a width of w are arrayed in the radial direction of the groove-formed surface, and, when the radius of the groove-formed surface is represented by r, $0.43 < n \times w < 1.00$ is satisfied.

According to this aspect of the plasticizing device, when the width w of the groove in the rotor is adjusted, it is possible to easily smoothen the lead of the material using the groove, and it is possible to stably plasticize the material.

(8) A fourth aspect is provided as a plasticizing device. This aspect of the plasticizing device includes a driving motor, a rotor that is rotated by the rotation of the driving motor and has a groove-formed surface having a groove formed in a rotation direction, and a barrel that is opposite to the groove-formed surface and has a communication hole and a heater, plasticizes a material supplied between the groove and the barrel by the rotation of the rotor and heating by the heater, and causes the plasticized material to flow out from the communication hole. The groove is formed in a spiral shape from the outer circumferential end toward the center of the groove-formed surface, the depth of the groove decreases from the outer circumferential end toward the center of the groove-formed surface, and, when the depth of the groove at the outer circumferential end of the groove-formed surface is represented by Da, and the depth of the groove at the center of the groove-formed surface is represented by db, $Da/db > 6.82$ is satisfied.

According to this aspect of the plasticizing device, when the depth of the groove in the rotor is adjusted, it is possible to easily smoothen the lead of the material using the groove, and it is possible to stably plasticize the material.

The technique of the present disclosure can also be realized in a variety of aspects other than the plasticizing device. For example, the technique can be realized in an aspect such as a rotor that is used in a plasticizing device, a flow path structure in the rotor, a three-dimensional modeling device including a plasticizing device, or an injection molding device including a plasticizing device.

What is claimed is:

1. A plasticizing device comprising:
a driving motor;
a rotor that is rotated by rotation of the driving motor and has a groove-formed surface having a groove formed in a rotation direction; and
a barrel that is opposite to the groove-formed surface and has a communication hole and a heater, wherein
the groove is formed in a spiral shape from an outer circumferential end of the groove-formed surface toward a center of the groove-formed surface,
a material supplied between the groove and the barrel is plasticized by rotation of the rotor and heating by the heater and is caused to flow out from the communication hole, and
a side surface of the groove has a protrusion and recess surface including protrusion portions or recess portions.

2. The plasticizing device according to claim 1, wherein the recess portions and the protrusion portions are formed along a rotation axis of the rotor and are alternately repeated in the rotation direction.

3. The plasticizing device according to claim 1, wherein the number of the recess portions or the protrusion portions increases from the center of the groove-formed surface toward the outer circumferential end of the groove-formed surface.

4. The plasticizing device according to claim 1, wherein the number of the recess portions or the protrusion portions increases from the outer circumferential end toward the center of the groove-formed surface.

5. A plasticizing device comprising:
a driving motor;
a rotor that is rotated by rotation of the driving motor and has a groove-formed surface having a groove formed in a rotation direction; and
a barrel that is opposite to the groove-formed surface and has a communication hole and a heater, wherein
the groove is formed in a spiral shape from an outer circumferential end of the groove-formed surface toward a center of groove-formed surface,
a material supplied between the groove and the barrel is plasticized by rotation of the rotor and heating by the heater and is caused to flow out from the communication hole, and
a surface roughness Ra of a side surface of the groove is 20 μm or more.

6. The plasticizing device according to claim 1, further comprising:
a protrusion and recess surface including protrusion portions or recess portions on a bottom surface of the groove.

7. A plasticizing device comprising:
a driving motor;
a rotor that is rotated by rotation of the driving motor and has a groove-formed surface having at least one groove formed in a radial direction of the groove-formed surface; and
a barrel that is opposite to the groove-formed surface and has a communication hole and a heater, wherein
a material supplied between the groove and the barrel is plasticized by rotation of the rotor and heating by the heater and is caused to flow out from the communication hole,
the at least one groove is formed in a spiral shape from an outer circumferential end of the groove-formed surface toward a center of the groove-formed surface, and
wherein the groove-formed surface is characterized by:

$$0.43 < \frac{n \times w}{r} < 1.00$$

where
n is a number of the at least one groove,
w is a width of the at least one groove, and
r is a radius of the groove-formed surface.

8. A plasticizing device comprising:
a driving motor;
a rotor that is rotated by rotation of the driving motor and has a groove-formed surface having a groove formed in a rotation direction; and
a barrel that is opposite to the groove-formed surface and has a communication hole and a heater, wherein
a material supplied between the groove and the barrel is plasticized by rotation of the rotor and heating by the heater and is caused to flow out from the communication hole, and
the groove is formed in a spiral shape from an outer circumferential end of the groove-formed surface toward a center of the groove-formed surface, and
a depth of the groove decreases from the outer circumferential end toward the center of the groove-formed surface, and
wherein the groove-formed surface is characterized by:

$$\frac{D_a}{D_b} > 6.82$$

where
$D_a$ is a depth of the groove at the outer circumferential end of the groove-formed surface, and
$D_b$ is a depth of the groove at the center of the groove-formed surface.

* * * * *